US012590214B2

(12) United States Patent
Nakamoto et al.

(10) Patent No.: US 12,590,214 B2
(45) Date of Patent: Mar. 31, 2026

(54) INK-JET INK

(71) Applicant: NIPPON SHOKUBAI CO., LTD.,
Osaka (JP)

(72) Inventors: Keiichi Nakamoto, Suita (JP); Takumi Ito, Suita (JP); Yoshimine Sakamoto, Suita (JP)

(73) Assignee: NIPPON SHOKUBAI CO., LTD.,
Osaka (JP)

( * ) Notice: Subject to any disclaimer, the term of this patent is extended or adjusted under 35 U.S.C. 154(b) by 788 days.

(21) Appl. No.: 17/789,577

(22) PCT Filed: Jan. 13, 2021

(86) PCT No.: PCT/JP2021/000799
§ 371 (c)(1),
(2) Date: Nov. 29, 2022

(87) PCT Pub. No.: WO2021/149548
PCT Pub. Date: Jul. 29, 2021

(65) Prior Publication Data
US 2023/0265301 A1      Aug. 24, 2023

(30) Foreign Application Priority Data

Jan. 23, 2020    (JP) ................................. 2020-009051

(51) Int. Cl.
| *C09D 11/107* | (2014.01) |
| *C09D 11/023* | (2014.01) |
| *C09D 11/38* | (2014.01) |

(52) U.S. Cl.
CPC .......... *C09D 11/107* (2013.01); *C09D 11/023* (2013.01); *C09D 11/38* (2013.01)

(58) Field of Classification Search
CPC ...... C09D 11/107; C09D 11/023; C09D 11/38
See application file for complete search history.

(56) References Cited

U.S. PATENT DOCUMENTS

| 6,802,893 | B1 | 10/2004 | Komatsu et al. | |
| 2002/0198287 | A1* | 12/2002 | Ohta ................... | C09D 11/322 |
| | | | | 523/160 |
| 2006/0014102 | A1* | 1/2006 | Tutikawa ............... | D21H 17/16 |
| | | | | 430/300 |

| 2010/0041816 | A1* | 2/2010 | Ikoshi ................. | C09D 11/322 |
| | | | | 524/502 |
| 2010/0055325 | A1 | 3/2010 | Sakai et al. | |
| 2010/0144943 | A1* | 6/2010 | Sakai ..................... | C09D 11/40 |
| | | | | 106/31.86 |
| 2010/0239759 | A1* | 9/2010 | Tojo .................... | C09D 11/322 |
| | | | | 427/256 |
| 2011/0037805 | A1* | 2/2011 | Arai ...................... | C09D 11/54 |
| | | | | 523/200 |
| 2014/0069295 | A1* | 3/2014 | Fujii ................... | B41J 2/17503 |
| | | | | 347/100 |
| 2016/0177116 | A1 | 6/2016 | Katsuragi et al. | |
| 2017/0037268 | A1 | 2/2017 | Wakabayashi et al. | |
| 2018/0187031 | A1 | 7/2018 | Teramoto et al. | |
| 2019/0077981 | A1 | 3/2019 | Jotome et al. | |
| 2020/0070554 | A1 | 3/2020 | Maegawa et al. | |

FOREIGN PATENT DOCUMENTS

| CN | 108250840 | A | 7/2018 |
| EP | 0 869 160 | A2 | 10/1998 |
| EP | 2196506 | A1 | 6/2010 |
| EP | 2230281 | A1 | 9/2010 |
| EP | 3249021 | A1 | 11/2017 |
| EP | 3540016 | A1 | 9/2019 |
| EP | 3848421 | A1 | 7/2021 |
| JP | 10-279870 | A | 10/1998 |
| JP | 2003-253177 | A | 9/2003 |
| JP | 2015-124223 | A | 7/2015 |
| TW | 201843283 | A | 12/2018 |
| WO | 00/75245 | A1 | 12/2000 |
| WO | 2017/154683 | A1 | 9/2017 |

OTHER PUBLICATIONS

International Search Report dated Apr. 6, 2021, issued in counterpart International Application No. PCT/JP2021/000799 (2 pages).
Extended (Supplementary) European Search Report dated Feb. 8, 2024. issued in counterpart EP Application No. 21744900.8. (6 pages).

* cited by examiner

*Primary Examiner* — John E Uselding
(74) *Attorney, Agent, or Firm* — WHDA, LLP

(57)                ABSTRACT

The ink-jet ink of the present invention comprises a solvent S having an SP value of 9.1-9.4, resin emulsion particles and water. It is preferable that the resin emulsion particles contain a (meth)acrylic polymer. It is also preferable that the resin emulsion particles contain a structural unit derived from styrene. It is also preferable that the solvent S is tripropylene glycol monomethyl ether and/or monoethylene glycol monoisopropyl ether.

12 Claims, No Drawings

INK-JET INK

TECHNICAL FIELD

The present invention relates to an ink-jet ink.

BACKGROUND

Inks, which are used in recording methods for printing by ejecting the inks from nozzles of printer heads and spraying them directly onto media to be printed, are required to have functions such as image uniformity and adhesion to the media to be printed with stable ejection.

Further, since the printed media are wound into rolls, the printed inks are also required that blocking is suppressed. In recent years, in consideration of the environment, ink compositions having the above functions and being based on water have been demanded. Additionally, it is required to print on recording media for commercial printing on resin films which do not absorb liquids as the media to be printed, for example: coated papers; polyester films such as polyethylene terephthalates (PET); polyvinyl chloride films; polypropylene films such as biaxially stretched polypropylene films (OPP); polyethylene films; nylon films; and the like. As the media to be printed, PET or OPP is preferably used, particularly.

Patent Literature 1 describes a water-based ink for ink jet printing, comprising a pigment (A), a water-insoluble polymer (B), an organic solvent (C) and water. The organic solvent (C) comprises diethylene glycol isopropyl ether (c1, SP value: 9.0) and an organic solvent (c2) having a 1-octanol/water partition coefficient that is smaller than that of the diethylene glycol isopropyl ether (c1), And a total content of the pigment (A), the water-insoluble polymer (B) and the diethylene glycol isopropyl ether (c1) in the water-based ink is 5.0% by mass or more. Further, a value obtained by multiplying a total content (% by mass) of the pigment (A) and the water-insoluble polymer (B) in the water-based ink by a content (% by mass) of the diethylene glycol isopropyl ether (c1) in the water-based ink is 10 or more and 300 or less. Patent Literature, 1 describes that the water-based ink for ink-jet printing is excellent in ejection stability and storage stability of the water-based ink, and is excellent in quick-drying fixability and image uniformity upon forming images.

Patent Literature 2 describes an ink jet ink set having a water-based ink and a reaction liquid, wherein the water-based ink contains an emulsion, a surfactant, an organic solvent, a pigment and water. The reaction liquid contains a coagulating agent, 1,2-alkanediol, a glycol ether solvent and/or a glycol ether acetate solvent, and water. The glass transition temperature of the emulsion is 50° C. or higher. Patent Literature 2 describes that the ink-jet ink set contains the water-based ink having excellent ejection stability and can form an image having excellent coating properties such as scratch resistance and adhesion.

In water-based ink-jet inks, there has been a demand for inks capable of forming images having even better adhesion.

CITATION LIST

Patent Literature

[Patent Literature 1] JP2015-124223
[Patent Literature 2] WO2017/154683

SUMMARY

Technical Problem

Therefore, an object of the present invention is to provide an ink-jet ink capable of forming an image having excellent adhesion and particularly excellent scratch resistance.

Solution to Problem

As a result of intensive research to solve the above problems, the present inventors has found that an ink-jet ink containing a solvent S having a specific SP value, resin emulsion particles, and water is suitable for a water-based ink. The present invention has been completed by finding that the above problems can be solved.

The ink-jet ink of the present invention comprises a solvent S having an SP value of 9.1 to 9.4, resin emulsion particles, and water.

The resin emulsion particles preferably contain a (meth) acrylic polymer.

Further, it is preferable that the resin emulsion particles further contain a structural unit derived from styrene.

The average particle size of the resin emulsion particles is preferably 150 to 350 nm.

It is preferable that the solvent S is tripropylene glycol monomethyl ether and/or monoethylene glycol monoisopropyl ether.

Advantageous Effects of Invention

According to the ink-jet ink of the present invention, it is possible to provide an ink-jet ink capable of forming an image having excellent adhesion and particularly excellent scratch resistance.

DESCRIPTION OF EMBODIMENTS

1. Ink-Jet Ink

The ink-jet ink of the present invention contains a solvent S having an SP value of 9.1 to 9.4, resin emulsion particles (resin particles), and water.

1-1 Solvent S

Examples of the solvent S contained in the ink-jet ink of the present invention having an SP value of 9.1 to 9.4 include: tripropylene glycol monomethyl ether (MFTG, SP value 9.1); monoethylene glycol monoisopropyl ether (iPG, SP value 9.2); and monopropylene glycol monopropyl ether (PFG, SP value 9.4). Among them, tripropylene glycol monomethyl ether and/or monoethylene glycol monoisopropyl ether are (is) preferable. As the solvent S, only one solvent may be used, or two or more solvents may be used in combination. Further, it may be used in combination with other organic solvents each having an SP value other than 9.1 to 9.4. In the ink-jet ink of the present invention, by containing the solvent S, the adhesion of the image formed by using the ink, particularly the scratch resistance, is excellent. When combined with the organic solvents each having an SP value other than 9.1 to 9.4, the content ratio of the solvent S to the total organic solvents of 100% by mass is preferably 10% by mass or more, and particularly preferably 30% by mass or more.

The SF value is a solubility parameter of Hildebrand and can be obtained, for example, from the product catalog of Nippon Emulsifier Co., Ltd.

The content of the solvent S is preferably 0.5% by mass or more and 20% by mass or less, and more preferably 5% by mass or more and 10% by mass or less, with respect to 100 parts by mass of the ink-jet ink of the present invention. When two or more kinds of solvents are used as the solvent S, the above-mentioned content is the total amount of them.

Examples of the other organic solvent include glycols such as propylene glycol, 1,3 propanediol, glycerin, dipropylene glycol, tripropylene glycol, diethylene glycal, triethylene glycol and tetraethylene glycol; monoethylene glycol ethers such as monoethylene glycol monomethyl ether, monoethylene glycol monoethyl ether, monoethylene glycol monopropyl ether, monoethylene glycol monobutyl ether, and monoethylene glycol monoisobutyl ether; monopropylene glycol ethers such as monopropylene glycol monomethyl ether, monopropylene glycol monoethyl ether, monopropylene glycol monopropyl ether, monopropylene glycol monoisopropyl ether, monopropylene glycol monobutyl ether and monopropylene glycol monoisobutyl ether; ethers of polyethylene glycol, such as monomethyl ether of polyethylene glycol (number of moles of EO added=2 to 10, preferably 2 to 4), monoethyl ether of polyethylene glycol (number of moles of EO added=2 to 10, preferably 2 to 4), monoethyl ether of polyethylene glycol (number of moles of EO added=2 to 10, preferably 2 to 4), monoisopropyl ether of polyethylene glycol (number of moles of EO added=2 to 10, preferably 2 to 4), monobutyl ether of polyethylene glycol (number of moles of EO added=2 to 10, preferably 2 to 4), and monoisobutyl ether of polyethylene glycol (number of moles of EO added=2 to 10, preferably 2 to 4); and ethers of polypropylene glycol such as monomethyl ether of polypropylene glycol (number of moles of EC) added=2 to 10, preferably 2 to 4), monoethyl ether of polypropylene glycol (number of moles of EO added=2 to 10, preferably 2 to 4), monopropyl ether of polypropylene glycol (number of moles of EO added=2 to 10, preferably 2 to 4), monoisopropyl ether of polypropylene glycol (number of moles of EO added=2 to 10, preferably 2 to 4), monobutyl ether of polypropylene glycol (number of moles of EO added=2 to 10, preferably 2 to 4), and monoisobutyl ether of polypropylene glycol (number of moles of EO added=2 to 10, preferably 2 to 4). Among them, propylene glycol, diethylene glycol, triethylene diethylene glycol monomethyl ether, diethylene glycol monoethyl ether, diethylene glycol monoisopropyl ether, diethylene glycol monobutyl ether, or diethylene glycol monoisobutyl ether is preferable. These organic solvents may be used alone, respectively, or may be used in combination of two or more.

In the inkjet ink of the present invention, it is preferable to use tripropylene glycol monomethyl ether (MFTG) in combination with monoethylene glycol monoisopropyl ether (iPG) or diethylene glycol monobutyl ether (BDG, SF value 9.5). In this case, when an image is formed with this ink for ink-jet, the ejection stability is excellent in addition to the excellent scratch resistance.

The total content of the solvent S and the organic solvent is preferably 1% by mass or more and 60% by mass or less, and more preferably 10% by mass or more and 50% by mass or less, based on 100 parts by mass of the ink-jet ink of the present invention.

1-2 Resin Emulsion Particles

The resin emulsion particles contained in the ink-jet ink of the present invention may preferably contain a structural unit derived from a monofunctional monomer and/or a structural unit derived from a polyfunctional monomer. The structural unit derived from the monofunctional monomer is obtained by polymerizing the monomer containing the monofunctional monomer, and the structural unit derived from the polyfunctional monomer is obtained by polymerizing the polyfunctional monomer. The monofunctional monomer and the polyfunctional monomer may be respectively used alone or may be used in combination.

Examples of the monofunctional monomers include ethylenically unsaturated double bond-containing monomers, but the monofunctional monomers are not limited to only these examples. These monomers may be used alone, respectively, or may be used in combination of two or more.

In addition, in this specification, "(meth) acrylate" means "acrylate" or "methacrylate", and "(meth) acryl" means "acryl" or "methacryl".

Examples of the ethylenically unsaturated double bond-containing monomers include acid group-containing monomers, alkyl (meth) acrylates, hydroxyl group-containing (meth) acrylates, piperidine group-containing monomers, oxo group-containing monomers, fluorine atom-containing monomers, nitrogen atom-containing monomers, epoxy group-containing monomers, alkoxyalkyl (meth) acrylates, silane group-containing monomers, carbonyl group-containing monomers, aziridinyl group-containing monomers, styrene type monomers, aralkyl (meth) acrylates, and addition-polymerizable oxazolines, but the ethylenically unsaturated double bond-containing monomers are not limited to only these examples.

These ethylenically unsaturated double bond-containing monomers may be used alone, respectively, or may be used in combination of two or more.

Examples of the acid group-containing monomers include carboxyl group-containing aliphatic monomers such as (meth) acrylic acid, maleic acid, fumaric acid, crotonic acid, itaconic acid, citraconic acid, maleic anhydride, maleic acid monomethyl ester, maleic acid monobutyl ester, itaconic acid monomethyl ester, itaconic acid monobutyl ester, and vinyl benzoic acid, but the present invention is not limited to only these examples. These acid group containing monomers may be used alone, respectively, or may be used in combination of two or more. Among these acid group-containing monomers, acrylic acid, methacrylic acid itaconic acid is preferable, and acrylic acid or methacrylic acid is more preferable, from the viewpoint of improving the dispersion stability of the resin emulsion particles.

Examples of the alkyl (meth) acrylates include alkyl (meth) acrylates each having 1 to 18 carbon atoms in the ester group such as methyl (meth) acrylate, ethyl (meth) acrylate, n-propyl (meth) acrylate, isopropyl (meth) acrylate, n-butyl (meth) acrylate, isobutyl (meth) acrylate, tert-butyl (meth) acrylate, sec-butyl (meth) acrylate, 2-ethylhexyl (meth) acrylate, n-octyl (meth) acrylate, tridecyl (meth) acrylate, cyclohexyl (meth) acrylate, n-lauryl (meth)acrylate, dodecyl (meth) acrylate, stearyl (meth) acrylate, and isobornyl (meth) acrylate, but the alkyl (meth) acrylates are not limited to only these examples. Among them, methyl (meth) acrylate, n-butyl (meth) acrylate, 2-ethylhexyl (meth) acrylate, or cyclohexyl (meth) acrylate is preferable. Cyclohexyl (meth) acrylate is further preferable from the viewpoint of achieving both scratch resistance and adhesion. These alkyl (meth) acrylates may be used alone, respectively, or may be used in combination of two or more.

Examples of the hydroxyl group-containing (meth) acrylates include hydroxyl group containing (meth) acrylates each having 1 to 18 carbon atoms in the ester group such as 2-hydroxyethyl (meth) acrylate, 2-hydroxypropyl (meth) acrylate, 3-hydroxypropyl (meth) acrylate, 2-hydroxybutyl (meth) acrylate, and 4-hydroxybutyl (meth) acrylate, but the hydroxyl group-containing (meth) acrylates are not limited to only these examples. Among them, 2-hydroxyethyl (meth) acrylate or 4-hydroxybutyl (meth) acrylate is preferable. These hydroxyl group-containing (meth) acrylates may be used alone, respectively, or may be used in combination of two or more.

Examples of the piperidine group containing monomers include 4-(meth) acryloyloxy-2,2,6,6-tetramethylpiperidine, 4-(meth) acryloylamino-2,2,6,6-tetramethylpiperidine, 4-(meta) acryloyloxy-1,2,2,6,6-pentamethylpiperidin, 4-(meth) acryloyl-1-methoxy-2,2,6,6-tetramethylpiperidine, 4-cyano-4-(meta) acryloyloxy-2,2,6,6-tetramethylpiperidine, 1-(meth) acryloyl-4-(meth) acryloylamino-2,2,6,6-tetramethylpiperidine, 4-crotonoylamino-2,2,6,6-tetramethylpiperidine, 4-(meth) acryloylamino-1,2,2,6,6-pentamethylpiperidine, 4-cyano-4-(meth) acryloylamino-2,2,6,6-tetramethylpiperidine, 4-crotonoyloxy-2,2,6,6-tetramethylpiperidine, 1-(meth) acryloyl-4-cyano-4-(meth) acryloylamino-2,2,6,6-tetramethylpiperidine and 1-crotonoyl-4-crotonoyloxy-2,2,6,6-tetramethylpiperidine, but the piperidine group-containing monomers are not limited to only these examples. Among them, 4-(meth) acryloyloxy-2,2,6,6-tetramethylpiperidine or 4-(meta) acryloyloxy-1,2,2,6,6-pentamethylpiperidin is preferable. These piperidine group-containing monomers may be used alone, respectively, or may be used in combination of two or more.

Examples of the oxo group-containing monomers include (di) ethylene glycol (methoxy) (meth) acrylates such as ethylene glycol (meth) acrylate, ethylene glycol methoxy (meth) acrylate, diethylene glycol (meth) acrylate, and diethylene glycol methoxy (meth) acrylate, but the oxo group-containing monomers are not limited to only these examples. These oxo group-containing monomers may be used alone, respectively, or may be used in combination of two or more.

Examples of the fluorine atom-containing monomers include fluorine atom-containing alkyl (meth) acrylates each having 2 to 6 carbon atoms in the ester group such as trifluoroethyl (meth) acrylate, tetrafluoropropyl (meth) acrylate, and octafluoropentyl (meth) acrylate, but the fluorine atom-containing monomers are not limited to only these examples. These fluorine atom-containing monomers may be used alone, respectively, or may be used in combination of two or more.

Examples of the nitrogen atom-containing monomers include: acrylamide compounds such as (meth) acrylamide, N-monomethyl (meth) acrylamide, N-monoethyl (meth) acrylamide, N,N-dimethyl (meth) acrylamide, N-n-propyl (meth) acrylamide, N-isopropyl (meth) acrylamide, methylenebis (meth) acrylamide, N-methylol (meth) acrylamide, N-butoxymethyl (meth) acrylamide, dimethylaminoethyl (meth) acrylamide N,N-dimethylaminopropyl acrylamide, and diacetone acrylamide; nitrogen atom-containing (meth) acrylate compounds such as dimethylaminoethyl (meth) acrylate and diethylaminoethyl (meth) acrylate; N-vinylpyrrolidone; and (meth) acrylonitrile, but the nitrogen atom-containing monomers are not limited to only these examples. Among them, (meth) acrylamide, diacetoneacrylamide, dimethylaminoethyl (meth) acrylate, diethylaminoethyl (meth) acrylate, N-vinylpyrrolidone or (meth) acrylonitrile is preferable. These nitrogen atom-containing monomers may be used alone, respectively, or may be used in combination of two or more.

Examples of the epoxy group-containing monomers include epoxy group-containing (meth) acrylates such as glycidyl (meth) acrylate, α-methylglycidyl (meth) acrylate, and glycidyl allyl ether, but the epoxy group-containing monomers are not limited to only these examples. These epoxy group-containing monomers may be used alone, respectively, or may be used in combination of two or more.

Examples of the alkoxyalkyl (meth) acrylates include methoxyethyl (meth) acrylate, methoxybutyl (meth) acrylate, ethoxybutyl (meth) acrylate, and trimethylolpropane tripropoxy (meth) acrylate, but the alkoxyalkyl (meth) acrylates are not limited to only these examples. These alkoxyalkyl (meth) acrylates may be used alone, respectively, or may be used in combination of two or more.

Examples of the silane group-containing monomers include vinyltrimethoxy silane vinyltriethoxy silane, vinyltri (methoxyethoxy) silane, γ-(meth) acryloyloxy propyltrimethoxy silane, 2-styrylethyl trimethoxy silane, vinyltrichloro silane, γ-(meth) acryloyloxy propylhydroxy silane, and γ-(meth) acryloyloxy propylmethylhydroxy silane, but the silane group-containing monomers are not limited to only these examples. These silane group-containing monomers may be used alone, respectively, or may be used in combination of two or more.

Examples of the carbonyl group-containing monomers include acrolein, formylstyrene, vinyl ethyl ketone, (meth) acrylic oxyalkylpropenal, acetonyl (meth) acrylate, diacetone (meth) acrylate, 2-hydroxypropyl (meth) acrylate acetylacetate, butanediol-1,4-acrylate acetylacetate, and 2-(acetoacetoxy) ethyl (meth) acrylate, but the carbonyl group-containing monomers are not limited to only these examples. Among them, 2-(acetoacetoxy) ethyl (meth) acrylate is preferable. These carbonyl group-containing monomers may be used alone, respectively, or may be used in combination of two or more.

Examples of the aziridinyl group-containing monomers include (meth) acryloyl aziridine and aziridinyl ethyl (meth) acrylate, but the aziridinyl group-containing monomers are not limited to only these examples. These aziridinyl group-containing monomers may be used alone, respectively, or may be used in combination of two or more.

Examples of the styrene type monomers include styrene, α-methylstyrene, p-methylstyrene, tert-methylstyrene, chlorostyrene, and vinyltoluene, but the styrene type monomers are not limited to only these examples. These styrene type monomers may be used alone, respectively, or may be used in combination of two or more. The styrene type monomers may have functional groups, for example groups such as methyl groups and tert-butyl groups, nitro groups, nitrile groups, alkoxyl groups, acyl groups, sulfone groups, hydroxyl groups, halogen atoms and the like on the benzene ring. Among the styrene type monomers, styrene is preferable, from the viewpoint of increasing the water resistance.

Examples of the aralkyl (meth) acrylates include aralkyl (meth) acrylates each having 7 to 18 carbon atoms in the aralkyl group such as benzyl (meth) acrylate, phenylethyl (meth) acrylate, methylbenzyl (meth) acrylate, and naphthylmethyl (meth) acrylate, but the aralkyl (meth) acrylates are not limited to only these examples. These aralkyl (meth) acrylates may be used alone, respectively, or may be used in combination of two or more.

Examples of the addition-polymerizable oxazolines include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-methyl-2-oxazoline, and 2-isopropenyl-5-ethyl-2-oxazoline, but the addition-polymerizable oxazolines are not limited to only these examples. These addition-polymerizable oxazolines may be used alone, respectively, or may be used in combination of two or more. Among these addition-polymerizable oxazolines, 2-isopropenyl-2-oxazoline is preferable because it is easily available.

Examples of the preferable monofunctional monomers include alkyl (meth) acrylates, hydroxyl group-containing (meth) acrylates, piperidine group-containing monomers, oxo group-containing monomers, fluorine atom-containing monomers, nitrogen atom-containing monomers, epoxy group-containing monomers, and styrene type monomers, and these monomers may be used alone, respectively, or may be used in combinations of two or more, Among these monofunctional monomers, from the viewpoint of further improving adhesion to corona-treated PET, OPP, and the like, the piperidine group-containing monomers, the nitrogen atom-containing monomers, or the addition-polymerizable oxazolines is preferable, the piperidine group-containing monomers or the addition-polymerizable oxazolines is more preferable, and 4-(meth) acryloyloxy-2,2,6,6-tetramethylpiperidine, 4-(meth), acryloyloxy-1,2,2,6,6-pentamethyl piperidine or 2-isopropenyl-2-oxazoline is further preferable. Further, it is preferable to contain the hydroxyl group-containing (meth) acrylates, because the emulsion particles without coarse particles can be easily obtained and the ejection stability of the ink containing these emulsion particles becomes excellent when the hydroxyl group-containing (meth) acrylates are contained as the monofunctional monomers.

It is preferable to contain piperidine group-containing monomers from the viewpoint of achieving both scratch resistance and adhesion.

The piperidine group-containing monomers, the addition-polymerizable oxazolines, and the hydroxyl group-containing (meth) acrylates are each contained in the monomer components in an amount of preferably 0.1% by mass or more, more preferably 0.2% by mass or more, and further preferably 0.5% by mass or more, from the viewpoint of further improving weather resistance and adhesion, and preferably 30% by mass or less, more preferably 20% by mass or less, and further preferably 10% by mass or less, from the viewpoint of improving water resistance. The piperidine group-containing monomers, the addition-polymerizable oxazolines, and the hydroxyl group-containing (meth) acrylates are each contained in the monomer components in an amount of more preferably 0.1 to 30% by mass, even more preferably 0.2 to 20% by mass, and further preferably 0.5 to 10% by mass.

When the resin emulsion particles are formed of a plurality of layers, the piperidine group-containing monomers and/or the addition-polymerizable oxazolines and/or the hydroxyl group-containing (meth) acrylates may be contained in the Monomer Components forming any layers. From the viewpoint of further improving adhesion, it is preferably that the piperidine group-containing monomers and/or the addition-polymerizable oxazolines and or the hydroxyl group-containing (meth) acrylates are/is contained in at least the monomer components forming the outermost layer. Therefore, it is preferable: that the Monomer components contain the piperidine group-containing monomers and/or the addition-polymerizable oxazolines and; or the hydroxyl group-containing (meth) acrylates; that when the resin emulsion particles are formed of the plurality of layers, at least the monomer components forming the outermost layer contain the piperidine group-containing monomers and/or the addition-polymerizable oxazolines and/or the hydroxyl group-containing (meth) acrylates; and that the piperidine group-containing monomers, the addition-polymerizable oxazolines, and the hydroxyl group-containing (meth) acrylates are each contained in the monomer components in an amount of more preferably 0.1 to 30% by mass, even more preferably 0.2 to 20% by mass, and further preferably 0.5 to 10% by mass.

Examples of the polyfunctional monomers include polyfunctional (meth) acrylates, for example: di (meth) acrylates of polyhydric alcohol each having 1 to 10 carbon atoms such as ethylene glycol di (meth) acrylate, propylene glycol di (meth) acrylate, 1,3-butanediol di (meth) acrylate. 1,4-butanediol di (meth) acrylate, 1,6-hexanediol di (meth) acrylate, ethylene oxide-modified 1,6-hexanediol di (meth) acrylate, 1,9-nonanediol di (meth) acrylate, propylene oxide-modified neopentyl glycol di (meth) acrylate and tripropylene glycol di (meth) acrylate; alkyldi (meth) acrylates in which number of moles of added alkylene oxide groups each having 2 to 4 carbon atoms is 2 to 50 such as polyethylene glycol di (meth) acrylate in which number of moles of added ethylene oxide groups is 2 to 50, polypropylene glycol di (meth) acrylate in which number of moles of added propylene oxide groups is 2 to 50, and tripropylene glycol di (meth) acrylate; tri (meth) acrylates of polyhydric alcohol each having 1 to 10 carbon atoms such as ethoxylated glycerin tri (meth) acrylate, propylene oxide-modified glycerol tri (meth) acrylate, ethylene oxide-modified trimethylolpropane tri (meth) acrylate, trimethylolpropane tri (meth) acrylate, pentaerythritol monohydroxy tri (meth) acrylate, and trimethylolpropane triethoxy tri (meth) acrylate; tetra (meth) acrylates of polyhydric alcohol each having 1 to 10 carbon atoms such as pentaerythritol tetra (meth) acrylate, dipentaerythritol tetra (meth) acrylate and ditrimethylolpropane tetra (meth) acrylate; penta (meth) acrylates of polyhydric alcohol each having 1 to 10 carbon atoms such as pentaerythritol penta (meth) acrylate and dipentaerythritol (monohydroxy) penta (meth) acrylate; hexa (meth) acrylates of polyhydric alcohol having each 1 to 10 carbon atoms such as pentaerythritol hexa (meth) acrylate; epoxy group-containing (meth) acrylates such as bisphenol A di (meth) acrylate, 2-(2'-vinyloxyethoxyethyl) (meth) acrylate and epoxy (meth) acrylate; and urethane (meth) acrylate, but the polyfunctional monomers are not limited to only these examples. These polyfunctional monomers may be used alone, respectively, or may be used in combination of two or more.

Among the polyfunctional monomers, from the viewpoint of achieving both blocking resistance and adhesion, alkyl di (meth) acrylates in which the alkyl group has 2 hydroxyl groups and 4 to 8 carbon atoms, polyethylene glycol di (meth) acrylates in which number of moles of added ethylene oxide groups is 2 to 50, polypropylene glycol di (meth) acrylates in which number of moles of added propylene oxide groups is 2 to 50, tri (meth) acrylates of polyhydric alcohol, tetra (meth) acrylates of polyhydric alcohol, penta (meth) acrylates of polyhydric alcohol or hexa (meth) acrylates of polyhydric alcohol is preferable, and ethylene glycol di (meth) acrylate, polyethylene glycol di (meth) acrylates in which number of moles of added ethylene oxide groups is 2 to 50, 1,4-butanediol di (meth) acrylate, trimethylolpropane tri (meth) acrylate, dipentaerythritol tetra (meth) acrylate or ditrimethylolpropane tetra (meth) acrylate is more preferable.

The resin emulsion particles are preferable to include the (meth) acrylic polymer, or to include the structural unit derived from styrene.

(Structural Unit Derived from Ultraviolet-Absorbing Monomer)

Further, from the viewpoint of imparting ultraviolet absorption to the resin emulsion particles, the resin emulsion particles may contain a structural unit derived from the ultraviolet absorbing monomer, within a range in which the objects of the present invention are not impaired.

Examples of the ultraviolet-absorbing monomers include benzotriazole type ultraviolet-absorbing monomers and benzophenone type ultraviolet-absorbing monomers, but the ultraviolet-absorbing monomers are not limited to only these examples. These ultraviolet-absorbing monomers may be used alone, respectively, or may be used in combination of two or more.

Examples of the benzotriazole type ultraviolet-absorbing monomers include 2-[2'-hydroxy-5'-(meth)acryloyloxy methylphenyl]-2H-benzotriazole, 2-[2'-hydroxy-5'-(meta) acryloyloxy ethylphenyl]-2H-benzotriazole, 2-[2'-hydroxy-5'(meth) acryloyloxy methylphenyl]-5-tert-butyl-2H-benzotriazole, 2-[2'-hydroxy-5'-(meth) acryloylamino methyl-5'-tert-octylphenyl]-2H-benzotriazole, 2-[2-[2'-hydroxy-5'-(meth) acryloyloxy propylphenyl]-2H-benzotriazole, 2-[2'-hydroxy-5'-(meth) acryloyloxy hexylphenyl]-2H-benzotriazole, 2-[2'-hydroxy-3-tert-butyl-5'-(meth) acryloyloxy ethylphenyl]-21-1-benzotriazole, 2-[2'-hydroxy-3'-tert-butyl-'5-(meth) acryloyloxy ethylphenyl]-5-chloro-2H-benzotriazole, 2-[2'-hydroxy-5'-tert-butyl-3'-(meth) acryloyloxy ethylphenyl]-2H-benzotriazole, 2-[2'-hydroxy-5' (meth) acryloyloxy ethylphenyl]-5-chloro-2H-berizotriazole, 2-[2-hydroxy-5' (meth) acryloyloxy ethylphenyl]-5-cyano-21-1-benzotriazole, 2-[2'-hydroxy-5' (meth) acryloyloxy ethylphenyl]-5-tert-butyl-2H-benzotriazole and 2-[2'-hydroxy-5°-(β-(meth) acryloyloxyethoxy)-3'-tert-butylphenyl]-4-tert-butyl-2H-benzotriazole, but the benzotriazole type ultraviolet-absorbing monomers are not limited to only these examples. These benzotriazole type ultraviolet-absorbing monomers may be used alone, respectively, or may be used in combination of two or more.

Examples of the benzophenone type ultraviolet-absorbing monomers include 2-hydroxy-4-(meth) acryloyloxy benzophenone, 2-hydroxy-4-[2-hydroxy-3-(meth) acryloyloxyl] propoxybenzopherione, 2-hydroxy-4-[2-(meth) acryloyloxy] ethoxybenzophenone, 2-hydroxy-4-[3-(meth) acryloyloxy-2-hydroxypropoxy] benzophenone, and 2-hydroxy-3-tert-butyl-4-[2-(meth) acryloyloxyl butoxybenzophenone, but the benzophenone type ultraviolet-absorbing monomers are not limited to only these examples. These benzophenone type ultraviolet-absorbing monomers may be used alone, respectively, or may be used in combination of two or more.

(Cross-Linking Agent)

By further adding cross-linking agents to the emulsion, cross-linking property can be imparted. The cross-linking agents may be the ones that start the cross-linking reaction at room temperature, or the ones that start the cross-linking reaction by heat. In the ink-jet ink of the present invention, blocking resistance and adhesion can be further improved by incorporating the cross-linking agents into the resin emulsion particles.

Preferable examples of the cross-linking agents include oxazoline group-containing compounds, isocyanate group-containing compounds, aminoplast resins, aziridine group-containing compounds, hydrazide group-containing compounds and carbodiimide group-containing compounds. These cross-linking agents may be used alone, respectively, or may be used in combination of two or more. Among these cross-linking agents, the oxazoline group-containing compounds are preferable from the viewpoint of improving the storage stability of the ink-jet ink of the present invention.

The oxazoline group-containing compounds are compounds having two or more oxazoline groups in each molecule. Examples of the oxazoline group-containing compounds include 2,2'-bis (2-oxazoline), 2,2'-methylene-bis (2-oxazoline), 2,2'-ethylene-bis (2-oxazoline), 2,2'-trimethylene-bis (2-oxazoline), 2,2'-tetramethylene-bis (2-oxazoline), 2,2'-hexamethylenebis (2-oxazoline), 2,2'-octamethylene-bis (2-oxazoline), 2,2'-ethylene-bis (4,4'-dimethyl-2-oxazoline), 2,2'-p-phenylene-bis (2-oxazoline), m-phenylene-bis (2-oxazoline), 2,2'-m-phenylene-bis (4,4'-dimethyl-2-oxazoline), bis (2-oxazolinyleyelohexane) sulfide, bis (2-oxazolinylnorbornan) sulfides, and oxazoline ring-containing polymers, but the oxazoline group-containing compounds are not limited to only these examples. These oxazoline group containing compounds may be used alone, respectively, or may be used in combination of two or more. Among the oxazoline group-containing compounds, water-soluble oxazoline group-containing compounds are preferable, and water-soluble oxazoline ring-containing polymers are more preferable, from the viewpoint of improving reactivity.

The oxazoline ring-containing polymers contain addition-polymerizable oxazolines as an essential component, and if necessary, can be easily prepared by polymerizing monomer components containing monomers copolymerizable with the addition-polymerizable oxazoline.

As the addition-polymerizable oxazolines, the ones similar to the examples indicated as the ethylenically unsaturated double bond-containing monomers can be used preferably.

The oxazoline group-containing compounds can be easily obtained commercially as, for example, trade names of Epocross WS-500, Epocross WS-700, Epocross K-2010, Epocross K-2020, and Epocross K-2030 manufactured by Nippon Shokubai Co., Ltd. and the like. Among them, the water-soluble oxazoline group-containing compounds such as trade name of Epocross WS-500 and Epocross WS-700 manufactured by Nippon Shokubai Co., Ltd. are preferable from the viewpoint of improving reactivity.

The isocyanate group-containing compounds are compounds containing isocyanate groups which can react with the hydroxyl groups contained, as functional groups, in the hydroxyl group-containing monomers used as the monomer components.

Examples of the isocyanate group-containing compounds include water-dispersed (blocked) polyisocyanates. The (blocked) polyisocyanates mean polyisocyanates and/or blocked polyisocyanates.

Examples of the water-dispersed polyisocyanates include ones dispersing polyisocyanates, which are imparted with hydrophilicity by polyethylene oxide chains, in water with anionic dispersants or nonionic dispersants.

Examples of the polyisocyanates include: diisocyanates such as hexamethylene diisocyanate and isophorone diisocyanate; and derivatives (modified products) of polyisocyanates such as trimethylolpropane adducts, biurets, and isocyanurates of these diisocyanates. The polyisocyanates are not limited to only these examples. These polyisocyanates may be used alone, respectively, or may be used in combination of two or more.

The water-dispersed polyisocyanates can be easily obtained commercially as, for example: trade names of Aquanate 100, Aquanate 110, Aquanate 200, Aquanate 210 and the like manufactured by Nippon Polyurethane Industry Co., Ltd.; trade names of Bayhydur TPLS-2032, SUB-isocyanate L801 and the like manufactured by Sumika Covestro Urethane Co., Ltd.; trade names of Takenate WD-720, Takenate WD-725, Takenate WD-220 and the like manufactured by Mitsui Takeda Chemical Co., Ltd.; and trade name of RESAMINE D-56 and the like manufactured by Dainichiseika Color & Chemicals Mfg. Co., Ltd.

The water-dispersed blocked polyisocyanates are obtained by blocking the isocyanate groups of the water-dispersed polyisocyanates with blocking agents. Examples of the blocking agents include diethyl malonate, ethyl acetoacetate, c-caprolactam, butanone oxime, cyclohexanone oxime, 1,2,4-triazole, dimethyl-1,2,4-triazole, 3,5-dimethyltriazole, and imidazole, but the blocking agents are not limited to only these examples. These blocking agents may be used alone, respectively, or may be used in combination of two or more. Among these blocking agents, the ones which cleave at 160° C. or lower, preferably 150° C. or lower, are desirable. Examples of the preferable blocking agents include butanone oxime, cyclohexanone oxime, and 3,5-dimethylpyrazole. Among them, butanone oxime is more preferable.

The water-dispersed blocked polyisocyanates can be easily obtained commercially as, for example; trade names of Takenate WB-720, Takenate WB-730, Takenate WB-920 and the like manufactured by Mitsui Takeda Chemical Co., Ltd.; and trade names of Bayhydur BL116, Bayhydur BL5140, Bayhydur BL5235. Bayhydur TPLS2186, Desmodur VPLS2310 and the like manufactured by Sumika Covestro Urethane Co., Ltd.

The aminoplast resins are addition-condensates of formaldehyde and compounds having amino groups such as melamine and guanamine. The aminoplast resins are also called as amino resins.

Examples of the aminoplast resins include: melamine resins such as dimethylol melamine, trimethylol melamine, tetramethylol melamine, pentamethylol melamine, hexamethylol melamine, fully alkylated methylated melamine, fully alkylated butylated melamine, fully alkylated isobutylated melamine, fully alkylated mixed etherified melamines, methylol group type methylated melamine, imino group type methylated melamine, methylol group type mixed etherified melamines and imino group type mixed etherified melamines; and guanamine resins such as butylated benzoguanamine methyl/ethyl mixed alkylated benzoguanamine, methyl/butyl mixed alkylated benzoguanamine and butylated glycoluril, but the aminoplast resins are not limited to only these examples. These aminoplast resins may be used alone, respectively, or may be used in combination of two or more.

The aminoplast resins can be easily obtained commercially as, for example, trade names of MYCOAT 505, MYCOAT 1128, CYMEL 232, CYMEL 235, CYMEL 254, CYMEL 303. CYMEL 325, CYMEL 370, CYMEL 771, and CYMEL 1170 and the like manufactured by Mitsui Cytec Co., Ltd.

Usually, an amount of the aminoplast resins is preferable to adjust a mass ratio of a solid content of the polymer components to a solid content of the aminoplast resins [solid content of the polymer components/solid content of the aminoplast resins] contained in the resin emulsion particles to from 60/40 to 99/1.

The aziridine group-containing compound is a compound having two or more aziridine groups in the molecule. Examples of the aziridine group-containing compounds include N,N'-diphenylmethane-4,4'-bis (1-aziridine carboxite), N,N'-toluene-2,4-bis (1-aziridine carboxite), bisisophthaloyl-1-(2-methylaziridine), tri-1-aziridinylphosphine oxide, N,N'-hexamethylene-1,6-bis (1-aziridine carboxite), 2,2'-bishydroxymethylbutanol-tris[3-(1-aziridinyl) propionate], trimethylpropantri-β-aziridinyl propionate, tetramethylolmethanetri-β-aziridinyl propionate, tris-2,4,6-(1-aziridinyl)-1,3,5-triazine, 4,4'-bis (ethyleneiminocarbonylamino) diphenylmethane. These may be used alone, respectively, or in combination of two or more.

Examples of the hydrazide compounds include saturated aliphatic carboxylic acid dihydrazides having 2 to 18 carbon atoms such as oxalic acid dihydrazide, malonic acid dihydrazide, succinic acid dihydrazide, glutaric acid dihydrazide, adipic acid dihydrazide, sebacinic acid dihydrazide; monoolefinic unsaturated dicarboxylic acid dihydrazides such as maleic acid dihydrazide, fumaric acid dihydrazide, itaconic acid dihydrazide; polyhydrazides carbonate such as dihydrazide carbonate; aromatic polycarboxylic acid polyhydrazides such as dihydrazide of phthalic acid, terephthalic acid or isophthalic acid, and dihydrazide, trihydrazide or tetrahydrazide of pyromellitic acid; aliphatic trihydrazides such as nitrilotriacetic acid trihydrazide, citrate trihydrazide, and 1,2,4-benzene trihydrazide; and tetrahydrazides such as ethylenediamine tetraacetic acid tetrahydrazide and 1,4,5,8-naphthoic, acid tetrahydrazide. These may be used alone, respectively, or in combination of two or more.

Examples of the carbodiimide group-containing compounds include UCARLNK Crosslinker XL-29SE supplied by Union Carbide Corporation, and Carbodilite E-02, E-03A, E-05, V-02, V-02-L2, and V-04 of Nisshinbo Chemical Inc. These may be used alone, respectively, or in combination of two or more.

Among the above-mentioned cross-linking agents, the addition-polymerizable oxazolines are preferable from the viewpoint of further improving the adhesion to corona-treated PET, OPP or the like.

In the present invention, in addition to the above-mentioned cross-linking agents, for example, the cross-linking agents such as polyvalent metal compounds typified by zirconium compounds, zinc compounds titanium compounds, aluminum compounds, etc. can be used within a range in which the objects of the present invention are not impaired.

1-2-1 Mean Particle Diameter of Resin Emulsion Particles

A mean particle diameter of the resin emulsion particles contained in the ink-jet inks of the present invention is preferably 150-350 nm. The mean particle diameter is more preferably 160 nm or more, further preferably 170 nm or more, and particularly preferably 180 nm or more, from the viewpoint of further improving image uniformity. The mean particle diameter is more preferably 330 nm or less, and further preferably 300 nm or less, from the viewpoint of further improving storage stability and water resistance.

In the present specification, the mean particle diameter of the resin emulsion particles is the value which is obtained with the cumulant method, and measured with a particle size distribution measuring device based on a dynamic light scattering method [manufactured by Otsuka Electronics Co., Ltd., product number: FPAR-1000].

1-2-2 Glass Transition Temperature

The resin emulsion particles preferably contain the polymer component having the glass transition temperature of 20° C. or more, and more preferably contain the polymer component having the glass transition temperature of 55° C. or more and the polymer component having the glass transition temperature of less than 55° C.

The glass transition temperature of the polymer component can be adjusted by adjusting the composition of the monomers used for the monomer components.

In the present specification, the glass transition temperature (Tg) of the polymer component means a temperature obtained with glass transition temperatures each obtained on a homopolymer of each of monomers used for the monomer components constituting the polymer component, based on the Fox equation represented by the following formula:

$$1/Tg=\Sigma(Wm/Tgm)/100$$

[In the formula, Wm indicates a content (% by mass) of a monomer <m> in the monomer components constituting the polymer component, and Tgm indicates a glass transition temperature (absolute temperature: K) of the homopolymer of the monomer <m>.]

The glass transition temperatures of the polymer components are, for example, 95° C. for a homopolymer of acrylic acid, 130° C. for a homopolymer of methacrylic acid, 105° C. for a homopolymer of methylmethacrylate, 100° C. for a homopolymer of styrene, 83° C. for a homopolymer of cyclohexyl methacrylate, 20° C. for a homopolymer of n-butyl methacrylate, −70° C. for a homopolymer of 2-ethylhexyl acrylate, −56° C. for a homopolymer of n-butyl acrylate, 55° C. for a homopolymer of hydroxyethyl methacrylate, 165° C. for a homopolymer of acrylamide, 130° C. for a homopolymer of 4-(meth) acryloyloxy-2,2,6,6-tetramethylpiperidine, 130° C. for a homopolymer of 4-methacryloyloxy-1,2,2,6,6-pentamethylpiperidin, 100° C. for a homopolymer of 2-[2'-hydroxy-5'-methacryloyloxyethylphenyl]-2H-benzotriazole, and 100° C. for a homopolymer of 2-isopropenyl-2-oxazoline.

The glass transition temperature of the polymer component is the value obtained based on the Fox equation. A measured value of the glass transition temperature of the polymer component is preferable to be the same value as the value obtained based on the Fox equation. The measured value of the glass transition temperature of the polymer component can be obtained, for example, by measuring a differential scanning calorimetry.

In the present specification, the glass transition temperature of the polymer component means the glass transition temperature obtained based on the above equation unless otherwise specified. For monomers whose glass transition temperatures are unknown, such as special monomers and polyfunctional monomers, when a total amount of the monomers whose glass transition temperatures are unknown in the monomer components is 10% by mass or less, the glass transition temperatures can be determined with only monomers whose glass transition temperatures are known. When the total amount of the monomers whose glass transition temperatures are unknown in the monomer components is more than 10% by mass, glass transition temperatures of (meth) acrylic type adhesive resins can be obtained with the differential scanning calorimetry analysis (DSC), a differential thermal analysis (DTA), thermomechanical analysis (TMA), and the like.

As measuring devices for the differential scanning calorimetry, for example, a measuring device manufactured by Seiko Instruments Inc., as the product number of DSC220C can be used. Further, when measuring the differential scanning calorimetry, methods of drawing a differential scanning calorimetry (DSC) curve, methods of obtaining a first derivative curve from the differential scanning calorimetry (DSC) curve, methods of performing a smoothing process, and methods of obtaining a target peak temperature are not particularly limited. For example, when the above measuring devices are used, drawing may be performed from the data obtained with the measuring device. At that time, an analysis software capable of performing a mathematical processing can be used. As the analysis software, for example, an analysis software manufactured by Seiko Instruments Inc., as the product number of EXSTAR6000 can be used, but the analysis software is not particularly limited to only that example. The peak temperature thus obtained may include an error of about 5° C. above or below due to drawing.

The resin emulsion particles may be core-shell resin emulsion particles in which the polymer components are layered with: the polymer component preferably having the glass transition temperature of 20° C. or more and more preferably having the glass transition temperature of 55° C. or more and the polymer component having the glass transition temperature of less than 55° C. Also, the resin emulsion particles may be resin emulsion particles in which the polymer components of: the polymer component preferably having the glass transition temperature of 20° C. or more and more preferably having the glass transition temperature of 55° C. or more; and the polymer component having the glass transition temperature of less than 55° C. are uniformly mixed. Alternatively, the resin emulsion particles may be a mixture of resin emulsion particles composed of the polymer component preferably having the glass transition temperature of 20° C. or more and more preferably having the glass transition temperature of 55° C. or more; and the resin emulsion particles composed of the polymer component having the glass transition temperature of less than 55° C. In the core-shell resin emulsion particles, the core portion may be composed of the polymer component: preferably having the glass transition temperature of 20° C. or more; and more preferably having the glass transition temperature of 55° C. or more, and the shell portion may be composed of the polymer component having the glass transition temperature of less than 55° C., or vice versa. When the resin emulsion particles contain: the polymer component preferably having the glass transition temperature of 20° C. or more and more preferably having the glass transition temperature of 55° C. or more; and the polymer component having the glass transition temperature of less than 55° C., both adhesion to substrates and blocking resistance can be achieved at the same time.

On the emulsion particle structure, as long as the emulsion particles include: the polymer component preferably having the glass transition temperature of 20° C. or more and more preferably having the glass transition temperature of 55° C., or more; and the polymer component having the glass transition temperature of less than 55° C., the emulsion particles, for example, may have the substantially uniformly mixed composition. However, the emulsion particles are preferable to have the layered structure. The layered structure specifically refers to the core-shell structure composed of the shell portion of the outermost layer and the core portion inside the shell portion. The core portion may have a substantially uniform composition or may have a layered structure (further core-shell structure). The core portion is preferable to have a substantially uniform composition.

A ratio of "a content of the polymer component preferably having the glass transition temperature of 20° C. or more and more preferably having the glass transition temperature of 55° C. or more" to "a content of the polymer component having the glass transition temperature of less than 55° C." as a mass ratio of "the content of the polymer component preferably having the glass transition temperature of 20° C. or more and more preferably having the glass transition temperature of 55° C. or more": "the content of the polymer component having the glass transition temperature of less than 55° C." is preferably 1:99 to 70:30, more preferably 1:99 to 40:60, and particularly preferably 1:99 to 30:70, When the resin emulsion particles contain two or more kinds of polymer components, the average glass transition temperature is preferably 0 to 30° C.

Among the resin emulsion particles contained in the ink-jet inks of the present invention, the resin emulsion particles, in which the core portion contains the polymer component preferably having the glass transition temperature of 20° C. or more and more preferably having the glass transition temperature of 55° C. or more, and the shell portion contains the polymer component having the glass transition temperature of 55° C. or less, are preferable. Here, when the emulsion particles are composed of the shell portion as the outermost layer and the core portion having the substantially uniform composition, "the glass transition temperature of the shell portion" and "the glass transition temperature of the core portion" have literal meanings. When "the core portion" is composed of multiple layers, "the glass transition temperature of the shell portion" means the glass transition temperature of the outermost layer, and the "the glass transition temperature of the core portion" means the average glass transition temperature of the core portion composed of the multiple layers.

The glass transition temperature of the polymer components of the core portion is preferably 20° C. or more, more preferably 60° C. or more, further preferably 70° C. or more, further more preferably 80° C. or more, particularly preferably 90° C. or more, and most preferably 95° C. or more. Further, an upper limit of the glass transition temperature of the polymer components of the core portion is preferably as high as possible from the viewpoint of blocking resistance. However, since film formation failure may occur when the glass transition temperature is too high the upper limit of the glass transition temperature is preferably 300° C. or less, and more preferably 200° C. or less.

The glass transition temperature of the polymer component of the shell portion is preferably 40° C. or less, more preferably 30° C. or less, further preferably 25° C. or less, further more preferably 20° C. or less, particularly preferably 15° C. or less, and most preferably 10° C. or less. Further, a lower limit of the glass, transition temperature of the polymer component of the shell portion is preferably −70° C. or more, more preferably −50° C. or more, further preferably −30° C. or more, and particularly preferably −20° C. or more.

As a combination of the glass transition temperature of the polymer components of the core portion and the glass transition temperature of the polymer component of the shell portion:

preferably, the glass transition temperature of the polymer components of the core portion is 20° C. or more (more preferably, the glass transition temperature of the polymer components of the core portion is further 200° C. or less), and the glass transition temperature of the polymer component of the shell portion is 25° C. or less (more preferably, the glass transition temperature of the polymer component of the shell portion is further −20° C. or more);

more preferably, the glass transition temperature of the polymer components of the core portion is 55° C. or more (more preferably, the glass transition temperature of the polymer components of the core portion is further 200° C. or less), and the glass transition temperature of the polymer component of the shell portion is 25° C. or less (more preferably, the glass transition temperature of the polymer component of the shell portion is further −20° C. or more);

further preferably, the glass transition temperature of the polymer components of the core portion is 90° C. or more (more preferably, the glass transition temperature of the polymer components of the core portion is further 200° C. or less), and the glass transition temperature of the polymer component of the shell portion is less than 55° C. (more preferably, the glass transition temperature of the polymer component of the shell portion is further −20° C. or more); and further more preferably, the glass transition temperature of the polymer components of the core portion is 90° C. or more (more preferably, the glass transition temperature of the polymer components of the core portion is further 200° C. or less), and the glass transition temperature of the polymer component of the shell portion is 25° C. or less (more preferably, the glass transition temperature of the polymer component of the shell portion is further −20° C. or more).

The shell portion preferably contains the piperidine group-containing monomers, and/or the addition-polymerizable oxazolines, and/or the hydroxyl group-containing (meth) acrylates. The piperidine group-containing monomers, the addition-polymerizable oxazolines, and the hydroxyl group-containing (meth) acrylates are each contained in the shell portion in an amount of preferably 0.1 to 30% by mass, more preferably 0.2 to 20% by mass, and further preferably 0.5 to 10% by mass, with respect to 100% by mass of the total amount of the monomers constituting the shell portion.

The core portion preferably contains styrene type monomers. A content of the styrene type monomers in the core portion is preferably 1 to 70% by mass with respect to 100% by mass of the total amount of the monomers constituting the core portion.

1-2-3 Other Properties (Acid Value)

The acid value derived from the carboxyl groups of the resin emulsion particles contained in the ink-jet inks of the present invention is preferably 0 to 6, and can be easily adjusted by adjusting the composition of the monomers used for the polymerization of the resin emulsion particles.

The acid value derived from the carboxyl groups of the resin emulsion particles is the mass of potassium hydroxide in milligrams that is required to neutralize the carboxyl groups present in one gram of the resin emulsion particles. When components to be the resin emulsion particles by polymerizing are ethylenically unsaturated double bond-containing monomers and the resin emulsion particles do not contain the other carboxyl groups, it is possible to approximate the mass of potassium hydroxide in milligrams that is required to neutralize carboxyl groups present in one gram of the ethylenically unsaturated double bond-containing monomer components as the acid value. In the present specification, the acid value derived from the carboxyl groups of the resin emulsion particles is a value that does not include the acid value derived from the acid groups other than the carboxyl groups in the emulsifiers and the initiators. The acid value is preferably 0 to 5, more preferably 0 to 4, further preferably) to 1, and particularly preferably 0. By lowering the acid value derived from the carboxyl groups of the resin emulsion particles, the image uniformity upon using as inks can be improved.

(Weight Average Molecular Weight)

In the ink-jet inks of the present invention, the weight average molecular weight of the polymer components constituting the resin emulsion particles is preferably 100,000 or more, more preferably 300,000 or more, further preferably 550,000 or more, and particularly preferably 600,000 or more, from the viewpoint of further improving water resistance and adhesion. An upper limit of the weight average molecular weight of the polymer components is preferably 5 million or less, from the viewpoint of improving the film forming property and water resistance.

In this specification, the weight average molecular weight means a weight average molecular weight (in terms of polystyrene) measured with a gel permeation chromatography [manufactured by TOSOH Corporation, product number: HLC-8120GPC, column: TSKgel G-5000HXL and TSKgel GMHXL-L are used in series].

1-2-4 Method of Producing Resin Emulsion Particles

The ink-jet inks of the present invention preferably comprise the emulsion including the resin emulsion particles as the polymer component emulsion-polymerized of the monomer component described above.

As the method of producing the resin emulsion particles included in the ink-jet inks of the present invention, above-mentioned monomer component is preferably emulsion-polymerized under the existence of emulsifiers.

Examples of methods of emulsion-polymerization of the monomer components include: methods having dissolving process of dissolving emulsifiers in media such as water and aqueous media containing water and water-soluble organic solvents, for example, lower alcohols such as methanol, and having dropping process of dropping the monomer components and polymerization initiators into the media under stirring; and methods having dropping process of dropping the monomer components pre-emulsified with the emulsifiers and water into water or the aqueous media, but the methods are not limited to only these methods. An amount of the media may be appropriately set in consideration of a content of non-volatile matter contained in the emulsion to be obtained. The media may be charged in a reaction vessel in advance, or may be used as a pre-emulsion. Further, if necessary, the media may be used when the monomer components are emulsion-polymerized to prepare the emulsion.

When the monomer components are emulsion-polymerized, the monomer components may be emulsion-polymerized after mixing the monomer components, the emulsifiers and the media, or the monomer components may be emulsion-polymerized after preparing the pre-emulsion by stirring the monomer components, the emulsifiers and the media to be emulsified, or the monomer components may be emulsion-polymerized by mixing at least one of the monomer components, the emulsifiers and the media with the pre-emulsion of the rest thereof. Each of the monomer components, the emulsifiers and the media may be added all at once, may be added in portions, or may be continuously added dropwise.

When an outer layer composed of a polymer component for the outer layer (shell) is formed on the resin emulsion particles contained in the emulsion obtained above, the outer layer can be formed on the resin emulsion particles by emulsion-polymerizing monomer components in the above emulsion in the same, manner as described above. Further, when the other outer layer is further formed on the resin emulsion particles on which the outer layer (intermediate layer) is formed, the other outer layer composed of a polymer component for the other outer layer can be further formed on the resin emulsion particles by emulsion-polymerizing monomer components in the above emulsion in the same manner as described above. As described above, the resin emulsion particles having a multi-layer structure (core-shell resin emulsion particles) can be prepared by the multi-stage emulsion-polymerization method.

When preparing the core-shell resin emulsion particles, one or more stages of emulsion-polymerization may be carried out before carrying out emulsion-polymerization for forming the inner layer (core) composed of the polymer component for the inner layer first, or, one or more stages of emulsion-polymerization may be carried out between the emulsion-polymerization for forming the inner layer and the emulsion-polymerization for forming the intermediate layer. Further, one or more stages of emulsion-polymerization may be carried out between the emulsion-polymerization for forming the intermediate layer and the emulsion-polymerization for forming the outer layer. Additionally, one or more stages of emulsion-polymerization may be carried out after carrying out emulsion-polymerization for forming the outer layer.

(Emulsifiers)

Examples of the emulsifiers used in emulsion-polymerization include anionic emulsifiers, nonionic emulsifiers, cationic emulsifiers, amphoteric emulsifiers, and polymer emulsifiers, and these emulsifiers may be used alone, respectively, or may be used in combination of two or more.

Examples of the anionic emulsifiers include: alkyl sulfate salts such as ammonium dodecyl sulfate and sodium dodecyl sulfate; alkyl sulfonate salts such as ammonium dodecyl sulfonate, sodium dodecyl sulfonate, and sodium alkyldiphenylether disulfonate; alkyl aryl sulfonate salts such as ammonium dodecylbenzene sulfonate and sodium dodecylnaphthalene sulfonate; polyoxyethylene alkyl sulfonate salts; polyoxyethylene alkyl sulfate salts; polyoxyethylene alkylaryl sulfate salts; diallyl sulfosuccinate salts; aryl sulfonic acid-formalin condensates; fatty acid salts such as ammonium laurylate and sodium stearate; sulfate esters or salts thereof having allyl groups such as bis (polyoxyethylene polycyclic phenyl ether) methacrylate sulfonate salts, propenyl-alkyl sulfosuccinate ester salts, (meth) acrylate polyoxyethylene sulfonate salts, (meth) acrylate polyoxyethylene phosphonate salts, and allyl oxymethylalkyloxy polyoxyethylene sulfonate salts; sulfate ester salts of allyloxymethylalkoxyethyl polyoxyethylene and polyoxyalkylene alkenyl ether sulfate ammonium salts, but the anionic emulsifiers are not limited to only these examples.

Examples of the nonionic emulsifiers include polyoxyethylene alkyl ethers, polyoxyethylene alkyl aryl ethers, condensates of polyethylene glycols with polypropylene glycols, sorbitan fatty acid esters, polyoxyethylene sorbitan fatty acid esters, fatty acid monoglycerides, condensates of ethylene oxides with aliphatic amines, allyloxymethyl alkoxyethylhydroxy polyoxyethylenes, and polyoxyalkylene alkenyl ethers, but the nonionic emulsifiers are not limited to only these examples.

Examples of the cationic emulsifiers include alkylammonium salts such as dodecylammonium chloride, but the cationic emulsifiers are not limited to only these examples.

Examples of the amphoteric emulsifiers include betaine ester type emulsifiers, but the amphoteric emulsifiers are not limited to only these examples.

Examples of the polymer emulsifiers include poly (meth) acrylate salts such as sodium polyacrylate; polyvinyl alcohol; polyvinylpyrrolidone; polyhydroxyalkyl (meth) acrylates such as polyhydroxyethyl acrylate; and copolymers containing copolymer components derived from one or more monomers constituting these polymers, but the polymer emulsifiers are not limited to only these examples.

Further, as the above-mentioned emulsifiers, emulsifiers having a polymerizable group, that is, so-called reactive emulsifiers are preferable from the viewpoint of further improving water resistance and image uniformity, and non-nonylphenyl type emulsifiers axe preferable from the viewpoint of environmental protection.

Examples of the reactive emulsifiers include propenyl-alkyl sulfosuccinate ester salts, (meth) acrylate polyoxyethylene sulfonate salts meth acrylate polyoxyethylene phosphonate salts [for example, manufactured by Sanyo Chemical Industries, Ltd., trade name: ELEMINOR RS-30, etc.], polyoxyethylene alkylpropenylphenyl ether sulfonate salts [for example, manufactured by DKS Co., Ltd., trade name: AQUALON HS-10, etc.], sulfonate salts of allyloxymethyl alkyloxy polyoxyethylene [for example, manufactured by DKS Co., Ltd., trade name: AQUALON KH-10, etc.], sulfonate salts of allyloxymethylnonyl phenoxyethyl hydroxypolyoxyethylene [for example, manufactured by ADEKA Corporation, trade name: ADEKA REASOAP SE-10, etc.], allyloxymethylalkoxyethyl hydroxypolyoxyethylene sulfate ester salts [for example, manufactured by ADEKA, Corporation, trade name: ADEKA REASOAP SR-10, SR-20, SR 30, etc.], bis (polyoxyethylene polycyclic phenyl ether) methacrylate sulfonate salts [for example, manufactured by Nippon Nyukazai Co., Ltd., trade name: ANTOX MS-60, etc.], allyloxymethylalkoxyethyl hydroxypolyoxyethylenes [for example, manufactured by ADEKA Corporation, trade name: ADEKA REASOAP ER-20, etc.], polyoxyethylene alkylpropenylphenyl ethers [for example, manufactured by DKS Co., Ltd., trade name: AQUALON RN 20, etc.], and allyloxymethylnonyl phenoxyethyl hydroxypolyoxyethylenes [for example, ADEKA Corporation, trade name: ADEKA REASOAP NE-10, etc.], but the reactive emulsifiers are not limited to only these examples.

An amount of the emulsifiers per 100 parts by mass of the monomer components is preferably 0.5 parts by mass or more, more preferably 1 part by mass or more, and further preferably 2 parts by mass or more by mass or more, from the viewpoint of improving the polymerization stability. The amount of the emulsifiers per 100 parts by mass of the monomer components is preferably 10 parts by mass or less, more preferably 6 parts by mass or less, and further preferably 3 parts by mass or less, from the viewpoint of improving water resistance.

(Polymerization Initiators)

Examples of the polymerization initiators include: azo compounds such as azobisisobutyronitrile, 2,2-azobis (2-methylbutyronitrile), 2,2-azobis (2,4-dimethylvaleronitrile), 2,2-azabis (2-diaminopropane) hydrochloride, 4,4-azobis (4-cyanovaleric acid), and 2,2-azobis (2-diethylpropionamidine); persulfates such as ammonium persulfate and potassium persulfate; and peroxides such as hydrogen peroxide, benzoyl peroxide, parachlordbenzoyl peroxide, lauroyl peroxide, and ammonium peroxide, but the polymerization initiators are not limited to only there examples. These polymerization initiators may be used alone, respectively, or may be used in combination of two or more.

An amount of the polymerization initiators per 100 parts by mass of the monomer components is preferably 0.05 parts by mass or more, and more preferably 0.1 part by mass or more, from the viewpoint of increasing the polymerization speed and reducing the residual amount of the unreacted monomer components. The amount of the polymerization initiators per 100 parts by mass of the monomer components is preferably 1 part by mass or less, and more preferably 0.5 part by mass or less, from the viewpoint of improving water resistance.

Addition methods of adding the polymerization initiators are not particularly limited. Examples of the addition methods include batch preparation, split preparation, and continuous dropping. Further, from the viewpoint of accelerating the end time of the polymerization reaction, a part of the polymerization initiators may be added before or after the completion of adding the monomer components into the reaction system.

In order to promote the decomposition of the polymerization initiators, for example, reducing agents such as sodium bisulfite, and decomposition agents of the polymerization initiators may be added in an appropriate amount into the reaction system. Examples of the decomposition agents of the polymerization initiators include transition metal salts such as ferrous sulfate.

(Chain Transfer Agents)

In addition, chain transfer agents can be used in order to adjust the weight average molecular weight of the resin emulsion particles. Examples of the chain transfer agents include 2-ethylhexyl thioglycolate, tert-dodecyl mercaptan, n-octyl mercaptan, n-dodecyl mercaptan, mercaptoacetic acid, mercaptopropionic acid, 2-mercaptoethanol, α-methylstyrene, and α-methyl styrene dimers, but the chain transfer agents are not limited to only these examples. These chain transfer agents may be used alone, respectively, or may be used in combination of two or more. An amount of the chain transfer agents per 100 parts by mass of the monomer components is preferably 0.01 to 10 parts by mass, from the viewpoint of appropriately adjusting the weight average molecular weight of the resin emulsion particles.

(Other Conditions)

Further, if necessary, additives such as pH buffers, chelating agents and film-forming auxiliary agents may be added to the reaction system. Since an amount of the additives varies depending on the type of additives, it cannot be determined unconditionally. Usually, the amount of the additives per 100 parts by mass of the monomer components is preferably about 0.01 to 5 parts by mass, and more preferably about 0.1 to 3 parts by mass.

An atmosphere of the emulsion-polymerization of the monomer components is not particularly limited, but is preferably inert gases such as nitrogen gas, from the viewpoint of increasing the working efficiency of the polymerization initiators.

A polymerization temperature upon emulsion-polymerizing the monomer components is not particularly limited, but is usually preferably 50 to 100° C. and more preferably 60 to 95° C. The polymerization temperature may be constant or may be changed during the polymerization reaction.

A polymerization time for emulsion-polymerizing the monomer components is not particularly limited, and may be appropriately set according to the progress of the polymerization reaction, but is usually about 2 to 9 hours.

When the monomer components are emulsion-polymerized, a part or all of the acidic groups contained in the obtained polymer components may be neutralized with neutralizing agents. The neutralizing agents may be used in the final stage after adding the monomer components, may be used between the first-stage polymerization reaction and the second-stage polymerization reaction for example, and may be used at the end of the initial emulsion-polymerization reaction.

Examples of the neutralizing agents include alkaline substances such hydroxides of alkali metals and alkaline earth metals, for example, sodium hydroxide and the like: carbonates of alkali metals and alkaline earth metals, for example, sodium hydrogen carbonate, calcium carbonate and the like; and organic amines, for example, ammonia, monomethylamine, dimethylaminoethanol and the like, but the neutralizing agents are not limited to only these examples. Among these neutralizing agents, the volatile alkaline substances such as ammonia are preferable from the viewpoint of improving water resistance, and sodium hydrogen carbonate is preferable from the viewpoint of improving the storage stability of the resin emulsion particles. The neutralizing agents can be used, for example, as aqueous solutions thereof.

Further, when the monomer components are emulsion-polymerized, silane coupling agents may be used in an appropriate amount, from the viewpoint of improving water resistance. Examples of the silane coupling agents include silane coupling agents having polymerizable unsaturated bonds such as a (meth) acryloyl group, a vinyl group, an allyl group, and a propenyl group, but the silane coupling agents are not limited to only these examples. In addition, "(meth) acryloyl" means "acryloyl" or "methacryloyl".

By emulsion-polymerizing of the monomer components as described above, the emulsions containing the resin emulsion particles can be obtained.

When the outer layer is formed on the resin emulsion particles obtained above, it is preferable to emulsion-polymerize the monomer components constituting the outer layer after reaching a reaction rate of the resin emulsion particles polymerization of 90% or more, preferably 95% or more, from the viewpoint of forming a layer-separated structure in the resin emulsion particles.

After forming the inner layer and before forming the outer layer of the resin emulsion particles, if necessary, the layer composed of the other polymer component may be formed within a range in which the objects of the present invention are not impaired. Therefore, when producing the resin emulsion particles contained in the ink-jet inks of the present invention, if necessary, after forming the inner layer and before forming the outer layer of the resin emulsion particles, the layer composed of the other polymer component may be formed within a range in which the objects of the present invention are not impaired.

The monomer components used for forming the outer layer can be the same as the monomer components used as raw materials for the inner layer of the resin emulsion particles. Further, the emulsion-polymerization method and polymerization conditions for forming the outer layer can be the same as the method and polymerization conditions for producing the inner layer of the resin emulsion particles.

The resin emulsion particles having the inner layer and the outer layer can be obtained as described above. If necessary, a surface layer composed of another polymer component may be further formed on a surface of the outer layer, within a range in which the objects of the present invention are not impaired.

After preparing the inner layer of the resin emulsion particles as described above, by forming the outer layer on the inner layer, the resin emulsion particles having the inner layer and the outer layer can be obtained.

1-3 Water

The ink-jet inks of the present invention are the water-based inks which contain water. A content of water is preferably 20% by mass or more and 80% by mass or less, and more preferably 25% by mass or more and 70% by mass or less, with respect to 100 parts by mass EA the ink-jet inks of the present invention.

1-4 Pigments

The ink-jet inks of the present invention is preferable to further contain pigments. Examples of the pigments include organic pigments and inorganic pigments, and the pigments may be used alone, respectively, or may be used in combination of two or more. In addition, if necessary, they can be used in combination with extender pigments.

Examples of the organic pigments include azo pigments such as benzidine and hansa yellow, diazo pigments, azomethine pigments, methine pigments, anthraquinone pigments, phthalocyanine pigments such as phthalocyanine blue, perinone pigments, perylene pigments, diketopyrrolopyrrole pigments, thioindigo pigments, iminoisoindrin pigments, isoindolinone pigments such as iminoisoindolinone, dioxazine pigments, quinacridone pigments such as quinacridone red and quinacridone violet, flavanthrone pigments, indanthrone pigments, anthrapyrimidine pigments, carbazole pigments, monoarylide diarylide henzoimidazolone yellow, trill orange, naphthol orange, and quinophthalone pigments.

The hue is not particularly limited, and any chromatic pigments such as yellow, magenta, cyan, blue, red, orange, and green can be used. For specific examples, one or more products with product numbers selected from the group consisting of C.I. Pigment Yellow, C.I. Pigment Red, C.I. Pigment Orange, C.I. Pigment Violet, C.I. Pigment Blue and C.I. Pigment Green can be used.

These organic pigments may be used alone, respectively, or may be used in combination of two or more.

Examples of the inorganic pigments include titanium dioxide, antimony trioxide, zinc white, lithopone, lead white, red iron oxide, black iron oxide, chromium oxide green, carbon black, chrome yellow, molybdenum red, ferric ferrocyanide (Prussian blue), ultramarine, and lead chromate, and further include: pigments having flat shapes such as mica, clay, aluminum powder, talc, and aluminum silicate; and the extender pigments such as calcium carbonate, magnesium hydroxide, aluminum hydroxide, barium sulfate and magnesium carbonate. Further, examples of the carbon black include furnace black, thermal lamp black, acetylene black, and channel black. These inorganic pigments may be used alone, respectively, may be used in combination of two or more.

An amount of the pigments per 100 parts by mass of the non-volatile matter of the ink-jet inks is preferably 40 parts by mass or more, and more preferably 50 parts by mass or more, from the viewpoint of improving concealing property of the printed matter formed with the ink-jet inks of the present invention, and is preferably 90 parts by mass or less from the viewpoint of further improving adhesion.

1-5 Other Components

The ink-jet inks of the present invention may contain the other resin emulsion particles except for the above-mentioned resin emulsion particles contained in the above-mentioned ink-jet inks, within a range in which the objects of the present invention are not impaired.

In addition, the ink-jet inks of the present invention may contain additives such as ultraviolet absorbers, ultraviolet stabilizers, fillers, surfactants, dispersants, thickeners, wetting agents, plasticizers, stabilizers, defoamers, dyes, antioxidants, preservatives, and leveling agents in appropriate amounts within a range in Which the objects of the present invention are not impaired. For example, surfactants of acetylene glycol type, of polyether modified silicone type, of fluorine type, or the like can be added.

As the dispersants, ionic dispersants are preferable. A content of the dispersants is preferably 0.1% by mass or more and 2.0% by mass or less, and more preferably 0.2% by mass or more and 1.0% by mass or less, with respect to 100 parts by mass of the ink-jet inks of the present invention.

1-6 Ink Properties (Minimum Film Formation Temperature).

The minimum film formation temperature of the ink-jet ink of the present invention is preferably 40° C. or less, more preferably 20° C. or less, further preferably 0° C. or less, from the viewpoint of further improving adhesion.

In the present specification, the minimum film forming temperature of the inkjet ink means a temperature at which a crack of a coating of the ink-jet ink is generated during drying. The coating of the ink-jet ink is formed by coating the ink-jet ink on a glass plate, which is placed on a thermal gradient tester, with an applicator so as to have a thickness of 0.2 mm.

(Content of Non-Volatile Matter)

The content of the non-volatile matter in the ink-jet ink of the present invention is preferably 5% by mass or more, and more preferably 7% by mass or more, from the viewpoint of improving concealing property and color density, and is preferably 50% by mass or less, and more preferably 40% by mass or less, from the viewpoint of improving storage stability.

In the present specification, the content of the non-volatile matter in the ink-jet ink means a value obtained by weighing 1 g of the ink-jet ink, drying it in a hot air dryer at a temperature of 150° C. for 1 hour, obtaining a residue as the non-volatile matter, and calculating based on the following equation.

[Content of Non-volatile Matter in Ink-Jet Ink (mass %)]=([Mass of Residue]÷[1 g of Ink-Jet Ink])× 100

The ink-jet inks of the present invention can be suitably used as water-based inkjet inks. Further, it can be suitably used as water-based inks for films which do not absorb liquids described later. In particular, it can be suitably used as water-based ink-jet inks for films which do not absorb liquids.

In the inkjet inks of the present invention, use of the inkjet inks far water-based ink-jet inks is preferable. Further, in the ink-jet inks of the present invention, use of the ink-jet inks for films which do not absorb liquids described later is preferable. Use of the ink-jet inks for water-based ink-jet inks for films which do not absorb liquids is particularly preferable.

The ink-jet inks of the present invention can be suitably used to print on recording media for commercial printing using resin films which do not, absorb liquids, for example; coated papers; polyester films such as polyethylene tereph-thalates (PET); polyvinyl chloride films; polypropylene films such as biaxially stretched polypropylene films (OPP); polyethylene films; nylon films; and the like. Particularly, the ink-jet inks of the present invention can be suitably used to print on the resin films which do not absorb liquids, such as PET and OPP.

[Printed Articles]

The ink-jet inks of the present invention can be used for printing on conventionally known articles to be printed such as coated papers and resin films, to be able to make printed articles.

<Articles to be Printed >

Examples of the articles to be printed preferably include the films which do not absorb liquids, for example, coated papers which da not absorb liquids, and the resin films, which do not absorb liquids, such as: polyester films, for example, polyethylene terephthalates (PET) and the like; polyvinyl chloride films; polypropylene films, for example, biaxially stretched polypropylene films (OPP) and the like; polyethylene films; and nylon films. Among them, biaxially stretched polypropylene films (OPP) or polyethylene tere-phthalates (PET) is more preferable.

Further, among the films Which do not absorb liquids, the films whose surfaces, on which the inks far water-based inks of the present invention is printed, are chemically or physi-cally modified with corona treatments, anchor coating treat-ments or the like are preferable, since the adhesion to a coated membrane formed by the ink-jet inks of the present invention or the inks for water-based inks of the present invention becomes more excellent. The corona-treated biaxially stretched polypropylene films (OFF) or the corona-treated polyethylene terephthalates (PET) are particularly preferable.

According to the printed articles obtained by printing the ink-jet inks of the present invention on the articles to be printed, it is possible to provide printed articles having excellent image uniformity and adhesion and excellent blocking resistance.

[Method for Producing Printed Article]

The ink jet inks of the present invention can be used in ink jet printing. As the ink jet printing methods, for example, thermal printing, piezo printing, charge deflection control printing (continuous ejection printing), and the like are preferable.

According to the methods for producing printed articles using the ink-jet inks of the present invention, it is possible to provide methods for producing printed articles which are excellent in image uniformity and adhesion and have excel-lent blocking resistance.

EXAMPLES

Next, the present invention will be described in more detail based on Examples, but the present invention is not limited to such Examples. In the following examples, unless otherwise specified, "parts" means "parts by mass" and "%" means "% by mass".

<Glass Transition Temperature of Polymer Component>

The glass transition temperature (Tg) of the polymer component was obtained by calculating with the glass transition temperature of the homopolymer of each of the monomers used for the monomer components constituting the polymer component, based on the Fox equation repre-sented by the following formula:

$$1/Tg=\Sigma(Wm/Tgm)/100$$

[In the formula, Wm indicates the content (% by mass) of the monomer <m> in the monomer components constituting the polymer component, and Tgm indicates the glass transition temperature (absolute temperature: K) of the homopolymer of the monomer <m>.]

<Acid Value Derived from Carboxyl Groups of Resin Emul-sion Particles>

The acid value derived from the carboxyl groups of the resin emulsion particles was obtained by approximating the mass of potassium hydroxide in milligrams that is required to neutralize carboxyl groups present in one grain of the used monomer components, as an acid value.

Example 1

716 parts of deionized water were charged in a flask equipped with a dropping funnel, a stirrer, a nitrogen gas introduction pipe, a thermometer and a reflux condenser. A pre-emulsion for first-stage dropping consisting of 63 parts of deionized water, 18 parts of 25% aqueous solution of the emulsifier [manufactured by ADEKA Corporation, trade name: ADEKA REASOAP SR-10], 140 parts of methyl methacrylate, 5 parts of styrene and 5 parts of acrylamide was prepared in the dropping funnel. 77 parts of the pre-emulsion for first-stage dropping, which were 5% of the total amount of all monomer components, were added into the flask. The flask was heated to 70° C. with gently blowing nitrogen gas, and 10 parts of 5% ammonium persulfate aqueous solution were added to start polymerization. Then, the rest of the pre-emulsion for dropping and 5 parts of 5% ammonium persulfate aqueous solution were uniformly dropped into the flask over 30 minutes.

After completion of the dropping, the contents in the flask were maintained at 70° C. for 60 minutes, and adjusted to pH 9 by adding 25% aqueous ammonia. Afterwards a pre-emulsion for second-stage dropping consisting of 355 parts of deionized water, 42 parts of 25% aqueous solution of the emulsifier [manufactured by ADEKA Corporation, trade name: ADEKA REASOAP SR-10], 380 parts of methyl methacrylate, 70 parts of n-butyl acrylate, 330 parts of 2-ethylhexyl acrylate, 20 parts of hydroxyethyl methacrylate and 50 parts of 2-isopropenyl-2-oxazoline with 25 parts of 5% ammonium persulfate aqueous solution were uniformly dropped into the flask over 210 minutes.

After completion of the dropping, the contents in the flask were maintained at 70° C. for 60 minutes, adjusted to pH 3 by adding 25% aqueous ammonia, and the polymerization was completed. The obtained reacted liquid was cooled to the room temperature, and then filtered through a 300 mesh wire net to prepare an emulsion. The content of the non-volatile matter in this emulsion was 45%, the acid value derived from the carboxyl groups of the resin emulsion particles was 0 mgKOH/g. The resin emulsion particles were constituted with an inner layer resin and an outer layer resin, the glass transition temperature of the inner layer resin was 107° C. and the glass transition temperature of the outer layer resin was −3° C. The minimum film formation temperature was 0° C. or less, and the mean particle diameter was 150 nm.

30 parts of a white paste, 20 parts of propylene glycol, 5 parts of tripropylene glycol monomethyl ether (MFTG, SP value: 9.1), 5 parts of diethylene glycol monobutyl ether (BDG, SP value: 9.5), 0.4 parts of surfactant [KF-6011 manufactured by Shin-Etsu Chemical Industry Co., Ltd.], and ion-exchanged water were added to 22 parts of the obtained emulsion while stirring with a homodisper at a rotation speed of 1000 min$^{-1}$. An amount of the ion-exchanged water was determined so that the total amount became 100 parts. The mixture was further stirred for 30 minutes, and then filtered through a 3 μm filter [MCP-3-C10S manufactured by Advantech Co. Ltd.] to prepare Ink-jet ink 1.

The white paste was prepared by dispersing the mixture of 411 parts of deionized water, 67 parts of dispersant [Aqualic HL-415 manufactured by Nippon Shokubai Co., Ltd.], 30 parts of 25% ammonia water, 60 parts of propylene glycol, and 1000 parts of titanium oxide [CR-95 manufactured by Ishihara Sangyo Co., Ltd.], and 200 parts of glass beads (diameter 1 mm) with the disper at a rotation speed of 3000 min$^{-1}$ for 120 minutes, and then filtering through a 300 mesh wire net.

Example 2

Ink-jet ink 2 was prepared in the same manner as in Example 1 except for using 10 parts of tripropylene glycol monomethyl ether (MFTG, SP value: 9.1 instead of 5 parts of tripropylene glycol monomethyl ether (MFTG, SP value: 9.1) and 5 parts of diethylene glycol monobutyl ether (BDG, SP value: 9.5).

Example 3

Ink-jet ink 3 was prepared in the same manner as in Example 1 except for using 10 parts of monoethylene glycol monoisopropyl ether (iPG, SP value: 9.2) instead of 5 parts of tripropylene glycol monomethyl ether (MFTG, SP value: 9.1) and 5 parts of diethylene glycol monobutyl ether (BDG, SP value: 9.5).

Example 4

Ink-jet ink 4 was prepared in the same manner as in Example 1 except for using 10 parts of monopropylene glycol monopropyl ether (PFG, SP value: 9.4) instead of 5 parts of tripropylene glycol monomethyl ether (MFTG, SP value: 9.1) and 5 parts of diethylene glycol monobutyl ether (BDG, SP value: 9.5).

Comparative Example 1

Ink-jet ink C1 was prepared in the same manner as in Example 1 except for using 10 parts of diethylene glycol isopropyl ether (PFG, SP value: 9.0) instead of 5 parts of tripropylene glycol monomethyl ether (MFTG, SP value: 9.1) and 5 parts of diethylene glycol monobutyl ether (BDG, SP value: 9.5).

Comparative Example 2

Ink-jet ink C2 was prepared in the same manner as in Example 1 except for using 10 parts of ethylene glycol mono 2-ethylhexyl ether (MFTG, SP value: 9.0) instead of 5 parts of tripropylene glycol monomethyl ether (MFTG, SP value: 9.1) and 5 parts of diethylene glycol monobutyl ether (BDG, SP value: 9.5).

Example 5

Ink-jet ink 5 was prepared in the same manner as in Example 1 except for using 5 parts of tripropylene glycol monomethyl ether (MFTG, SP value: 9.1) and 5 parts of monoethylene glycol monoisopropyl ether (iPG, SP value: 9.2) instead of 5 parts of tripropylene glycol monomethyl ether (MFTG, SP value: 9.1) and 5 parts of diethylene glycol monobutyl ether (BDG, SP value: 9.5).

Example 6

Ink-jet ink 6 was prepared in the same manner as in Example 3, except that 3 parts of the pre-emulsion for first-stage dropping in Example 1, which were 0.2% of the total amount of all monomer components, were added into the flask. The mean particle diameter of this emulsion was 245 nm.

Comparative Example 3

Ink-jet ink C3 was prepared in the same manner as in Example 1 except for using 10 parts of diethylene glycol monobutylether (BDG, SP value: 9.5) instead of 5 parts of tripropylene glycol monomethyl ether (MFTG, SP value: 9.1) and 5 parts of diethylene glycol monobutyl ether (BDG, SP value: 9.5).

Example 7

Ink-jet ink 7 was prepared in the same manner as in Example 1 except that: 1.5 parts of the pre-emulsion for first-stage dropping in Example 1, which were 0.1% of the total amount of all monomer components, were added into the flask; and 10 parts of monoethylene glycol monoisopropyl ether (iPG, SP value: 9.2) was used instead of 5 parts of tripropylene glycol monomethyl ether (MFTG, SP value: 9.1) and 5 parts of diethylene glycol monobutyl ether (BDG, SP value: 9.5). The mean particle diameter of this emulsion was 320 nm.

Example 8

Ink-jet ink was prepared in the same manner as in Example 1 except for using 5 parts of diethylene glycol monobutyl ether (BDG, SP value: 9.5) and 5 parts of monoethylene glycol monoisopropyl ether (iPG, SP value: 9.2) instead of 5 parts of tripropylene glycol monomethyl ether (MFTG, SF value: 9.1) and 5 parts of diethylene glycol monobutyl ether (BDG, SP value: 9.5).

Example 9

Ink-jet ink 9 was prepared in the same manner as in Example 1 except for using 5 parts of diethylene glycol monobutyl ether (BDG, SP value: 9.5) and 5 parts of monopropylene glycol monopropyl ether (PFG, SP value: 9.4) instead of 5 parts of tripropylene glycol monomethyl ether (MFTG, SP value: 9.1) and 5 parts of diethylene glycol monobutyl ether (BDG, SP value: 9.5).

Example 10

Ink-jet ink 10 was prepared in the same manner as in Example 1 except for using 4-methacryloyloxy-2,2,6,6-tetramethylpiperidine [manufactured by ADEKA Corporation, trade name: ADEKA STUB LA-87] instead of 2-isopropenyl-2-oxazoline in the pre-emulsion for second-stage dropping. The mean particle diameter of this emulsion was 180 nm.

Example 11

Ink-jet ink 11 was prepared in the same manner as in Example 1 except for using 4-methacryloyloxy-1,2,2,6,6-pentamethylpiperidine [manufactured by ADEKA Corporation, trade name: ADEKA STAB LA-82] instead of 2-isopropenyl-2-oxazoline in the pre-emulsion for second-stage dropping. The mean particle diameter of this emulsion was 180 nm.

Example 12

716 parts of deionized water were charged in a flask equipped with a dropping funnel, a stirrer, a nitrogen gas introduction pipe, a thermometer and a reflux condenser. A pre-emulsion for first stage dropping consisting of 63 parts of deionized water, 18 parts of 25% aqueous solution of the emulsifier [manufactured by ADEKA Corporation, trade name: ADEKA REASOAP SR-10], 50 parts of methyl methacrylate, 50 parts of styrene and 50 parts of 2-ethylhexyl acrylate was prepared in the dropping funnel. 77 parts of the pre-emulsion for first-stage dropping, which were 5% of the total amount of all monomer components, were added into the flask. The flask was heated to 70° C. with gently blowing nitrogen gas, and 10 parts of 5% ammonium persulfate aqueous solution were added to start polymerization. Then, the rest of the pre-emulsion for dropping and 5 parts of 5% ammonium persulfate aqueous solution were uniformly dropped into the flask over 30 minutes.

After completion of the dropping, the contents in the flask were maintained at 70° C. for 60 minutes, and adjusted to pH 9 by adding 25% aqueous ammonia. Afterwards a pre-emulsion for second-stage dropping consisting of 355 parts of deionized water, 42 parts of 25% aqueous solution of the emulsifier [manufactured by ADEKA Corporation, trade name: ADEKA REASOAP SR-10], 485 parts of methyl methacrylate, 70 parts of n-butyl acrylate, 225 parts of 2-ethylhexyl acrylate, 20 parts of hydroxyethyl methacrylate and 50 parts of 4-methacryloyloxy-2,2,6,6-tetramethylpiperidine [manufactured by ADEKA Corporation, trade name: ADEKA STUB LA-87] with 25 parts of 5% ammonium persulfate aqueous solution were uniformly dropped into the flask over 210 minutes.

After completion of the dropping, the contents in the flask were maintained at 70° C. for 60 minutes, adjusted to pH 8 by adding 25% aqueous ammonia, and the polymerization was completed. The obtained reacted liquid was cooled to the room temperature, and then filtered through a 300 mesh wire net to prepare an emulsion. The content of the non-volatile matter in this emulsion was 45%, the acid value derived from the carboxyl groups of the resin emulsion particles was 0 mgKOH/g. The resin emulsion particles were constituted with an inner layer resin and an outer layer resin, the glass transition temperature of the inner layer resin was 20° C., and the glass transition temperature of the outer layer resin was 20° C. The minimum film formation temperature was 30° C. and the mean particle diameter was 150 nm.

30 parts of a white paste, 20 parts of propylene glycol, 5 parts of tripropylene glycal monomethyl ether (MFTG, SP value: 9.1), 5 parts of diethylene glycol monobutyl ether (BDG, SP value: 9.5) 0.4 parts of surfactant [KF-6011 manufactured by Shin-Etsu Chemical Industry Co. Ltd.], and ion-exchanged water were added to 22 parts of the obtained emulsion while stirring with a homodisper at a rotation speed of 1000 min$^{-1}$. An amount of the ion-exchanged water was determined so that the total amount became 100 parts. The mixture was further stirred for 30 minutes, and then filtered through a 3 μm filter [MCP-3-C10S manufactured by Advantech Ltd.] to prepare Ink-jet ink 12.

The white paste was prepared by dispersing the mixture of 411 parts of deionized water, 67 parts of dispersant [Aqualic HL-415 manufactured by Nippon Shokubai Co., Ltd.], 30 parts of 25% ammonia water, 60 parts of propylene glycol, and 1000 parts of titanium oxide [CR-95 manufactured by Ishihara Sangyo Co., Ltd.], and 200 parts of glass beads (diameter 1 mm) with the disper at a rotation speed of 3000 min$^{-1}$ for 120 minutes, and then filtering through a 300 mesh wire net.

Example 13

Ink-jet ink 13 was prepared in the same manner as in Example 6 except that: 4-methacryloyloxy-2,2,6,6-tetramethylpiperidine [manufactured by ADEKA Corporation, trade name: ADEKA STAB LA-87] was used instead of 2-isopropenyl-2-oxazoline in the pre-emulsion for second-stage dropping; and 5 parts of diethylene glycol monobutyl ether (BDG, SP value: 9.5) and 5 parts of tripropylene glycol monomethyl ether (MFTG, SP value: 9.1) were used instead of 10 parts of monoethylene glycol monoisopropyl ether (iPG, SP value: 9.2). The mean particle diameter of this emulsion was 280 nm.

Example 14

Ink-jet ink 14 was prepared in the same manner as in Example 1 except for using 5 parts of diethylene glycol monobutyl ether (BDG, SP value: 9.5) and 5 parts of monoethylene glycol monoisopropyl ether (iPG, SP value: 9.2) instead of 5 parts of tripropylene glycol monomethyl ether (MFTG, SP value: 9.1) and 5 parts of diethylene glycol monobutyl ether (BDG, SP value: 9.5) in Example 10.

Example 15

716 parts of deionized water were charged in a flask equipped with a dropping funnel, a stirrer, nitrogen gas introduction pipe, a thermometer, and a reflux condenser. A pre-emulsion for first stage dropping consisting of 63 parts of deionized water, 18 parts of 25% aqueous solution of the emulsifier [manufactured by ADEKA Corporation, trade name: ADEKA REASOAP SR-10], 65 parts of methyl methacrylate, 65 parts of styrene and 20 parts of 2-ethyl-hexyl acrylate was prepared in the dropping funnel. 77 parts of the pre-emulsion for first-stage dropping, which were 5% of the total amount of all monomer components, were added into the flask. The flask was heated to 70° C. with gently blowing nitrogen gas, and 10 parts of 5% ammonium persulfate aqueous solution were added to start polymerization. Then, the rest of the pre-emulsion for dropping and 5 parts of 5% ammonium persulfate aqueous solution were uniformly dropped into the flask over 30 minutes.

After completion of the dropping, the contents in the flask were maintained at 70° C. for 60 minutes, and adjusted to pH 9 by adding 25% aqueous ammonia. Afterwards a pre-emulsion for second-stage dropping consisting of 355 parts of deionized water, 42 parts of 25% aqueous solution of the emulsifier [manufactured by ADEKA Corporation, trade name: ADEKA REASOAP SR-10], 485 parts of cyclohexyl methacrylate, 70 parts of n-butyl acrylate, 225 parts of 2-ethylhexyl acrylate, 20 parts of hydroxyethyl methacrylate and 50 parts of 4-methacryloyloxy-2,2,6,6-tetramethylpip-eridin [manufactured by ADEKA Corporation, trade name: ADEKA STAB LA-87] with 25 parts of 5% ammonium persulfate aqueous solution were uniformly dropped into the flask over 210 minutes.

After completion of the dropping, the contents in the flask were maintained at 70° C. for 60 minutes, adjusted to pH 3 by adding 25% aqueous ammonia, and the polymerization was completed. The obtained reacted liquid was cooled to the room temperature, and then filtered through a 300 mesh wire net to prepare an emulsion. The content of the non-volatile matter in this emulsion was 45%, the acid value derived from the carboxyl groups of the resin emulsion particles was 0 mgKOH/g. The resin emulsion particles were constituted with an inner layer resin and an outer layer resin, the glass transition temperature of the inner layer resin was 58° C., and the glass transition temperature of the outer layer resin was −4° C. The minimum film formation temperature was 10° C., and the mean particle diameter was 150 nm.

30 parts of a white paste, 20 parts of propylene glycol, 10 parts of tripropylene glycol monomethyl ether (MFTG, SP value: 9.1), 0.4 parts of surfactant [KF-6011 manufactured by Shin-Etsu Chemical Industry Co., Ltd.], and ion-exchanged water were added to 22 parts of the obtained emulsion while stirring with a homodisper at a rotation speed of 1000 min$^{-1}$. An amount of the ion-exchanged water was determined so that the total amount became 100 parts. The mixture was further stirred for 30 minutes, and then filtered through a 3 μm filter [MCP-3-C10S manufactured by Advantech Co. Ltd.] to prepare Ink-jet ink 15.

The white paste was prepared by dispersing the mixture of 411 parts of deionized water, 67 parts of dispersant [Aquatic HL-415 manufactured by Nippon Shokubai Co., Ltd.], 30 parts of 25% ammonia water, 60 parts of propylene glycol, and 1000 parts of titanium oxide [CR-95 manufactured by Ishihara Sangyo Co., Ltd.], and 200 parts of glass beads (diameter 1 mm) with the disper at a rotation speed of 3000 min$^{-1}$ for 120 minutes, and then filtering through a 300 mesh wire net.

Example 16

Ink-jet ink 16 was prepared in the same manner as in Example 1 except that the white paste of Example 1 was changed to the following.

White paste used in Example 16:

The mixture of 428 parts of deionized water, 50 parts of dispersant [Discoat N14 manufactured by Daiichi Kogyo Seiyaku Co., Ltd.], 60 parts of propylene glycol, 1000 parts of titanium oxide [CR-95 manufactured by Ishihara Sangyo Co., Ltd.], and 200 parts of glass beads (diameter 1 mm) were dispersed with the disper at a rotation speed of 3000 min$^{-1}$ for 120 minutes, and then filtered through a 300 mesh wire net to prepare the white paste.

Example 17

Ink-jet ink 17 was prepared in the same manner as in Example 1 except that the white paste of Example 1 was changed to the following.

White paste used in Example 17:

The mixture of 411 parts of deionized water, 97 parts of dispersant [BYK-190 manufactured by BYK], 60 parts of propylene glycol, 1000 parts of titanium oxide [CR-95 manufactured by Ishihara Sangyo Co., Ltd.], and 200 parts of glass beads (diameter 1 mm) were dispersed with the disper at a rotation speed of 3000 min$^{-1}$ for 120 minutes, and then filtered through a 300 mesh wire net to prepare the white paste.

Preparation of Inkjet Printed Article

Each of the ink-jet inks obtained in Examples and Comparative Examples was put into a print evaluation device (manufactured by Genesis Co., Ltd.) equipped with an inkjet recording head "KJ4B-YH06WST-STDV" (manufactured by Kyocera Corporation) in an environment with a temperature of 25±1° C. and a relative humidity of 30±5%.

A head voltage of 26 V, a frequency of 4 kHz, an appropriate amount of discharged liquid of 12 pl, a head temperature of 32° C. a resolution of 600 dpi, and a negative pressure of −4.0 kPa were set.

A corona-treated PET (Taiko Polyester Film FE2001 #25, manufactured by Futamura Chemical Co., Ltd.), as a recording medium, was fixed to a transport table in a direction so that a longitudinal direction and a transport direction of the recording medium were the same.

A print command was transferred to the print evaluation device, and the ink-jet ink was printed on the recording medium by an inkjet recording method as a solid image having a printing amount of 100% (12 pl, 600×600 dpi).

Immediately after that, the solid image was dried in a dryer at 70° C. for 10 seconds.

The obtained images were investigated on the following properties. The results are shown in Tables 1 and 2. If the image has at least one of evaluation D in the properties, the image was determined to be unacceptable.

(1) Ejection Stability (Image Uniformity)

The solid image was visually observed and the uniformity of the image was evaluated according to the following criteria ©: No white streaks or color unevenness occur in the solid image.

○: Some white streaks are seen in the solid image.

Δ: A little more white streaks are seen in the solid image.

X: White streaks and color unevenness are remarkably generated in the solid image.

(2) Scratch Resistance (Adhesion)

The printed article on which the solid image was printed was rubbed with a nail to confirm the adhesion according to the following criteria.

©: No peeling of the printed surface occurs.

○: The printed surface hardly peels off.

Δ: The printed surface is slightly peeled off.

X: The printed surface is peeled off.

TABLE 1

|  | Scratch resistance | Ejection stability |
|---|---|---|
| Example 1 | ○ | © |
| Example 2 | ○ | ○ |
| Example 3 | ○ | ○ |
| Example 4 | Δ | ○ |
| Example 5 | ○ | © |
| Example 6 | ○ | © |
| Comparative Example 1 | x | Δ |
| Comparative Example 2 | x | x |
| Comparative Example 3 | x | ○ |

TABLE 2

|  | Scratch resistance | Ejection stability |
|---|---|---|
| Example 7 | ○ | © |
| Example 8 | ○ | ○ |
| Example 9 | ○ | ○ |
| Example 10 | © | © |
| Example 11 | © | © |
| Example 12 | © | © |
| Example 13 | © | © |
| Example 14 | © | © |
| Example 15 | © | © |
| Example 16 | ○ | © |
| Example 17 | ○ | © |

From the results in Tables 1 and 2, it was found that the ink-jet inks of the Examples were excellent in the ejection stability, and superior to the ink-jet inks of the Comparative Examples in the scratch resistance of the formed images.

INDUSTRIAL APPLICABILITY

According to the ink jet inks of the present invention, ink-jet inks which can provide images having excellent scratch resistance can be provided. Particularly, the ink-jet inks of the present invention can be suitably used for printing on recording media for commercial printing using resin films which do not absorb liquids, for example: coated papers; polyester films such as polyethylene terephthalate (PET); polyvinyl chloride films: polypropylene films such as biaxially stretched polypropylene films (OPP): polyethylene films; nylon films; and the like.

The invention claimed is:

1. An ink-jet ink comprising a solvent S having an SP value of 9.1 to 9.4, resin emulsion particles, water, another organic solvent having an SP value other than 9.1 to 9.4, and a surfactant of a polyether modified silicone type, wherein the SP values are a solubility parameter of Hildebrand, wherein said resin emulsion particles contain a (meth) acrylic polymer, and wherein said another organic solvent is at least one selected from the group consisting of propylene glycol, diethylene glycol, triethylene glycol, diethylene glycol monomethyl ether, diethylene glycol monoethyl ether, diethylene glycol monoisopropyl ether, diethylene glycol monobutyl ether, and diethylene glycol monoisobutyl ether, wherein said resin emulsion particles have been obtained by emulsion-polymerization of a monomer component and a reactive emulsifier, and wherein an acid value derived from carboxyl groups of said resin emulsion particles is 0 to 6.

2. The ink-jet ink of claim 1, wherein said resin emulsion particles contain a structural unit derived from styrene.

3. The ink-jet ink of claim 1, wherein said resin emulsion particles have an average particle diameter of 150-350 nm.

4. The ink-jet ink of claim 1, wherein said solvent S is tripropylene glycol monomethyl ether and/or monoethylene glycol monoisopropyl ether.

5. The ink-jet ink of claim 1, wherein a content ratio of said solvent S to total organic solvents of 100% by mass is 10% by mass or more.

6. The ink-jet ink of claim 1, wherein a content of said solvent S is 0.5% by mass or more and 20% by mass or less, with respect to 100% by mass of said ink-jet ink.

7. The ink-jet ink of claim 1, wherein tripropylene glycol monomethyl ether (MFTG, SP value 9.1) as said solvent S is used in combination with monoethylene glycol monoisopropyl ether (iPG, SP value 9.2) as said solvent S or with diethylene glycol monobutyl ether (BDG, SP value 9.5) as the said another organic solvent, wherein the SP value is a solubility parameter of Hildebrand.

8. The ink-jet ink of claim 1, wherein a total content of said solvent S and said another organic solvent is 1% by mass or more and 60% by mass or less, with respect to 100% by mass of said ink-jet ink.

9. The ink-jet ink of claim 1, wherein said resin emulsion particles contain a polymer component having a glass transition temperature of 20° C. or more, and a polymer component having a glass transition temperature of less than 55° C.

10. The ink-jet ink of claim 1, which is a water-based ink for a film which does not absorb a liquid.

11. A printed article, which is printed with the ink-jet ink of claim 1 on a film which does not absorb a liquid.

12. The ink-jet ink of claim 1, wherein said reactive emulsifier contains a sulfonate salts of allyloxymethylnonyl phenoxyethyl hydroxypolyoxyethylene.

* * * * *